US012025711B2

(12) United States Patent
Cambridge et al.

(10) Patent No.: US 12,025,711 B2
(45) Date of Patent: Jul. 2, 2024

(54) CROWDSOURCED REPUTATIONS FOR WIRELESS NETWORKS

(71) Applicant: McAfee, LLC, San Jose, CA (US)

(72) Inventors: Rodney Derrick Cambridge, Ruilsip (GB); Jonathan David Dyton, Milton Keynes (GB); Andrea Vito Colucci, Wembley (GB)

(73) Assignee: McAfee, LLC, San Jose, CA (US)

(*) Notice: Subject to any disclaimer, the term of this patent is extended or adjusted under 35 U.S.C. 154(b) by 485 days.

(21) Appl. No.: 16/831,477

(22) Filed: Mar. 26, 2020

(65) Prior Publication Data
US 2021/0302592 A1 Sep. 30, 2021

(51) Int. Cl.
| | |
|---|---|
| *G01S 19/05* | (2010.01) |
| *G01C 21/20* | (2006.01) |
| *G06F 3/01* | (2006.01) |
| *G06T 19/00* | (2011.01) |
| *H04W 4/029* | (2018.01) |
| *H04W 48/16* | (2009.01) |

(52) U.S. Cl.
CPC .............. *G01S 19/05* (2013.01); *G01C 21/20* (2013.01); *G06F 3/011* (2013.01); *G06T 19/006* (2013.01); *H04W 4/029* (2018.02); *H04W 48/16* (2013.01); *G06T 2200/24* (2013.01)

(58) Field of Classification Search
CPC ......... G01S 19/05; G01C 21/20; G06F 3/011; G06T 19/006; G06T 2200/24; H04W 4/029; H04W 48/16
See application file for complete search history.

(56) References Cited

U.S. PATENT DOCUMENTS

| | | | |
|---|---|---|---|
| 8,769,130 B1* | 7/2014 | Chang | H04L 12/6418 370/352 |
| 9,622,081 B1 | 4/2017 | Satish | |
| 2005/0078644 A1* | 4/2005 | Tsai | H04L 67/303 370/338 |
| 2007/0258415 A1* | 11/2007 | Lu | H04W 12/50 370/338 |
| 2010/0157823 A1* | 6/2010 | Li | H04L 43/08 455/434 |
| 2013/0040603 A1* | 2/2013 | Stahlberg | H04L 63/14 455/410 |
| 2014/0055490 A1* | 2/2014 | Mule | H04N 21/41407 345/633 |

(Continued)

FOREIGN PATENT DOCUMENTS

| | | | | |
|---|---|---|---|---|
| CN | 105682015 A | * | 6/2016 | ............ H04W 12/06 |
| KR | 20060051119 A | * | 5/2006 | ......... G06K 19/0776 |

(Continued)

*Primary Examiner* — Ryan R Yang
(74) *Attorney, Agent, or Firm* — Patent Capital Group

(57) ABSTRACT

There is disclosed in one example a mobile computing apparatus, including: a hardware platform including a processor and a memory; a user display; a global positioning system (GPS) driver; a network interface; and instructions encoded within the memory to instruct the processor to: receive a device location from the GPS driver; via the network interface, query a cloud-based wireless access point (WAP) reputation service for WAP reputation data of nearby WAPs; and drive to the user display an image of nearby WAPs having overlaid thereon WAP reputation data for the nearby WAPs.

20 Claims, 15 Drawing Sheets

(56) References Cited

U.S. PATENT DOCUMENTS

| | | | | |
|---|---|---|---|---|
| 2015/0106390 A1* | 4/2015 | Fuchs | ............... | G06F 16/24578 |
| | | | | 707/749 |
| 2016/0019257 A1* | 1/2016 | Wither | .................... | H04W 4/02 |
| | | | | 707/756 |
| 2016/0073336 A1* | 3/2016 | Geller | ............... | H04W 72/0413 |
| | | | | 455/434 |
| 2016/0182940 A1* | 6/2016 | Assayag | ............ | H04N 21/6131 |
| | | | | 725/62 |
| 2017/0215085 A1* | 7/2017 | Udeshi | ................ | H04W 64/006 |
| 2018/0098196 A1* | 4/2018 | Dal Santo | ........... | G01S 5/02524 |
| 2019/0303807 A1 | 10/2019 | Gueye | | |

FOREIGN PATENT DOCUMENTS

| | | | | |
|---|---|---|---|---|
| KR | 100981581 B1 * | 9/2010 | .......... | H04W 36/005 |
| KR | 20120104648 A * | 9/2012 | ........ | G06Q 30/0282 |
| WO | WO 2010131415 A1 * | 11/2010 | ............. | H04M 1/67 |
| WO | 2017087251 A1 | 5/2017 | | |
| WO | WO 2018205997 A1 * | 11/2018 | ............ | H04W 12/06 |

\* cited by examiner

CROWDSOURCED REPUTATIONS FOR WIRELESS NETWORKS

FIELD OF THE SPECIFICATION

This application relates in general to network security, and more particularly, though not exclusively, to a system and method of providing crowdsourced reputations for wireless networks.

BACKGROUND

As the importance of mobile computing increases, internet users may require secure public networks to perform a growing variety of daily tasks.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
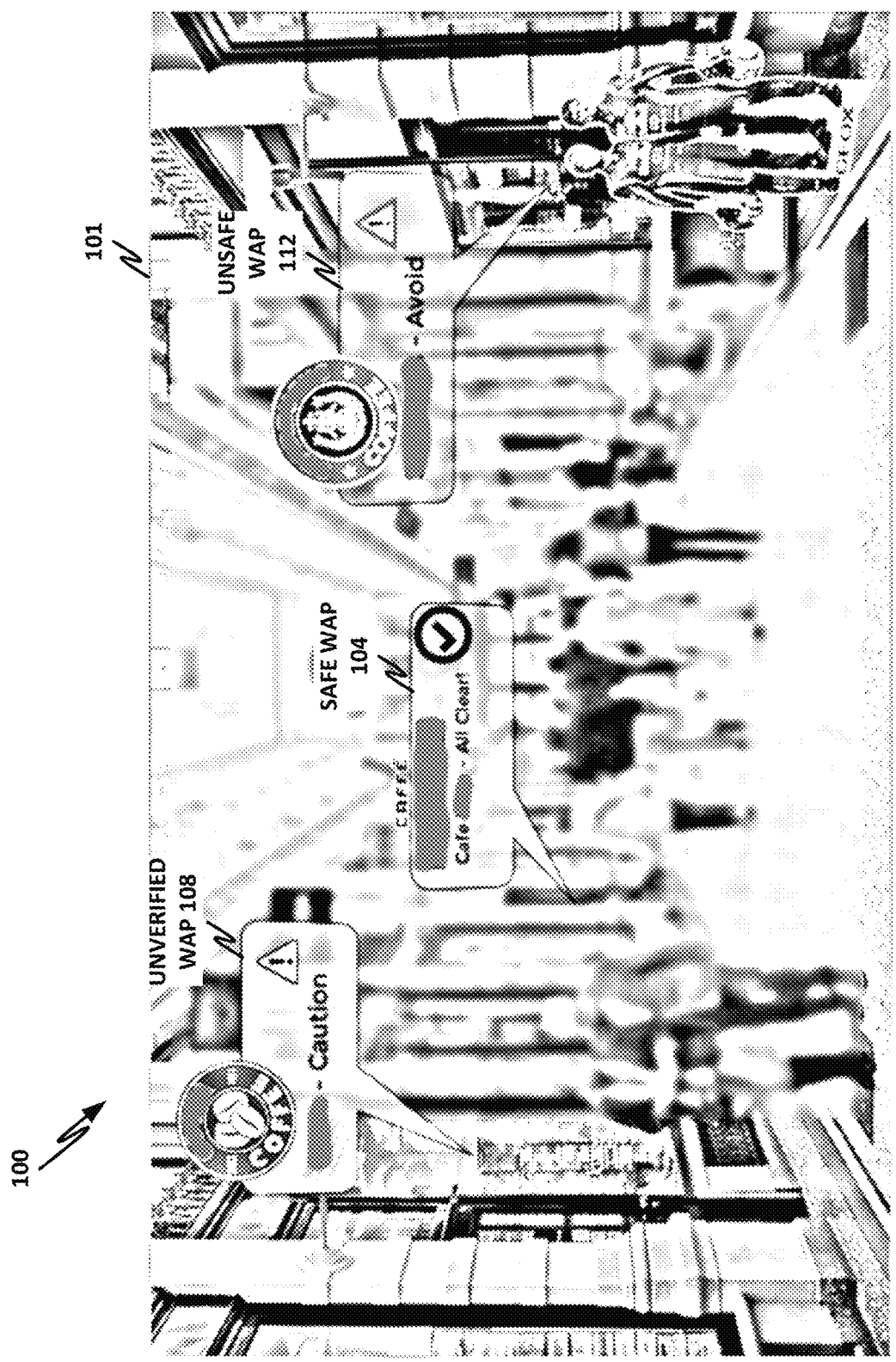
FIG. 1 is an illustration of a wireless network ecosystem.

In an example, there is disclosed a mobile computing apparatus, comprising: a hardware platform comprising a processor and a memory; a user display; a global positioning system (GPS) driver; a network interface; and instructions encoded within the memory to instruct the processor to: receive a device location from the GPS driver; via the network interface, query a cloud-based wireless access point (WAP) reputation service for WAP reputation data of nearby WAPs; and drive to the user display an image of nearby WAPs having overlaid thereon WAP reputation data for the nearby WAPs.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Modern computer users have portable computing devices capable of connecting to wireless networks, and those users expect to be able to connect to a wireless network virtually anywhere they go. Smart phones, tablets, laptops, and other portable devices provide great flexibility, allowing users to work, play, interact, and browse wherever a network is available. This flexibility is desirable to many users, but the convenience of having nearly unlimited options for accessing wireless networks may be offset by the security concerns of connecting to unknown wireless networks.

For example, many businesses such as restaurants, coffee shops, bookstores, and others provide free wireless access points (WAPs) to attract customers to their stores. Many hotels provide either free or paid WAPs so that their guests can conduct business, watch movies, browse, and engage in other networked activities while staying in the hotel. Some cities, airports, and other public places also provide free and/or paid WAPs for citizens and consumers.

While this is very convenient for users, it presents security questions that end users may not always be well equipped to handle. For example, some WAPs are well configured and well-secured, offering appropriate enterprise-grade security and encryption that the user can trust. Other WAPs may be poorly secured, and may provide no encryption or security, or may have poorly configured security, such as by using outdated security protocols such as wired equivalent privacy (WEP) and Wi-Fi protected access (WPA). In other cases, a WAP could be a malicious "honeypot" that encourages users to connect for free, and then mines the users' personal data as the users interact with social media, banking and e-commerce websites, and other sensitive destinations.

It is desirable for users to only connect to properly-secured networks that will protect their security and privacy. However, many users do not know the particulars of how to locate such networks, how to discriminate between secure and unsecure networks, and how to properly connect to those networks. While the use of a virtual private network (VPN) can address some of these security concerns, VPNs require more technical knowledge to configure and use than most end users possess.

There are existing security solutions to assign reputations to WAPs. For example, MCAFEE, LLC provides the McAfee Mobile Security (MMS) software, which provides comprehensive security to mobile devices. This comprehensive security includes providing a reputation for a WAP that the user has connected to. So, for example, if a user connects to a WAP in a coffee shop, MMS or a similar security agent can scan the configuration and notify the user whether the WAP has appropriate security, or whether its security configuration is lacking.

The utility and usability of such reputations can be increased by crowdsourcing reputations for WAPs so that users can know before connecting whether a WAP is secure. Such crowdsourced reputations can be enhanced by heuristic and behavioral data, and the user's interaction can be enhanced by providing an augmented reality layer for an augmented reality headset, an augmented reality for a cell phone display, an overlay on a map or navigation application, and/or authorized static or dynamic displays that can be provided by a business, all by way of illustrative and nonlimiting example.

In an embodiment, a security services provider crowdsources reputation data across a large sample of users and devices. For example, MCAFEE, LLC has security agents installed across more than a billion devices worldwide. These security agents can act as endpoints for a crowdsourcing ecosystem. In at least some embodiments, to preserve user privacy and security, crowdsourced data are collected anonymously and fully anonymized before being uploaded to a cloud service provided by the security service provider. The crowdsourced data may include metadata about the capability of the device, about external factors (e.g., the name and security capabilities of a WAP the device has been connected to), and other metadata that are useful in crowdsourcing a reputation. To preserve privacy, personally identifying information (PII) and other sensitive information that may identify the individual user and/or the individual device, or that may include confidential or personal information, may be stripped out before data are uploaded to the cloud.

With a large sample of endpoints acting as sensors for a crowdsourcing ecosystem, all of the users of the ecosystem benefit from having access to metadata collected by the many other nodes and endpoints in the ecosystem. Thus, a global reputation engine on a server operated by a security services provider can collect large amounts of data, including reputation data for WAPs. WAPs may be identified by name and location, or by other properties or attributes.

As reliable reputations are derived for various WAPs, a mobile application such as augmented reality glasses or an augmented reality display on the user's phone or laptop may be used to show the user in real time which WAPs are available from their present location, as well as the reputation for each WAP. For example, in an augmented reality display, the user may point her device's camera down a hallway of a shopping mall or other corridor containing a number of businesses. In real time, the camera feed is augmented with an overlay display showing available WAPs for the businesses within view, along with a reputation for each WAP. Thus, in choosing a business to patronize, the user can see not only the availability of a WAP at the business, but also the reputation for security and privacy of the WAP. This reputation may be an integer or floating-point numerical value, a letter grade (A, B, C, D, and F, or variations thereof), a star rating (one-star, two-star, three-star, four-star, or five-star, including partial stars or fractions of stars, as appropriate), or a simple red/yellow/green rating for safe, suspicious, or dangerous, or any other suitable rating scheme.

Because these public Wi-Fi networks are used by many establishments, including coffee shops, bars, retail stores, eateries, hotels, and others, users may be enticed to patronize those establishments to use the available Wi-Fi. The crowdsourced reputation of the present specification can help the user to recognize if a public Wi-Fi network is poorly configured, compromised, or even a fake Wi-Fi network that is pretending to be legitimate.

As mobile and wearable computing becomes increasingly commonplace, the chances of a wearable or mobile device connecting to a compromised, fake, or poorly configured Wi-Fi network increase. Adding to the risk inherent in public Wi-Fi access, some devices are configured to automatically connect to available public networks. Thus, the user may connect to an insecure or compromised Wi-Fi network without even being aware of the connection, or taking any proactive action.

However, with a security agent that uses crowdsourced Wi-Fi reputations, the user could configure the device to connect automatically only to networks that have a reputation above a given threshold, such as green, four-star or five-star, 8, 9, or 10 on a 1-to-10 scale, or some other reputation.

Advantageously, users of wearable and mobile devices can be clearly warned of unsafe networks in their vicinity as they move from place to place. This allows the users to avoid connecting to unsafe Wi-Fi networks, either automatically or actively. Alternatively, a user may be able to see the Wi-Fi reputation of a place overall, and may wish to disable Wi-Fi or to set the device to "airplane mode" at certain times or places.

This may include a multifactor contextual warning. Factors may include, for example, time, place, signal strength, the number of available WAPs compared to the number of WAPs with reliable reputations, or even scheduled events. As one nonlimiting example, the famous strip in Las Vegas, Nevada has many establishments with available free Wi-Fi. However, Las Vegas also hosts an annual hacker conference called Def Con. When Def Con is going on, the Las Vegas strip may be swarming with hackers who either maliciously or mischievously set up fake WAPs to try to collect user data, or otherwise attack users' mobile devices. A security agent of the present specification could warn the user which networks are legitimate and which are unsafe or unreliable. Alternatively, the security agent could warn that user contextually that it may be best to simply set their phone, tablet, or laptop to airplane mode while walking the Las Vegas strip during Def Con.

As described above, in some embodiments, a user may be shown Wi-Fi network reputations in real time using augmented or mixed reality, either through the screen of a mobile device, or through head-worn smart glasses. As the user views their surroundings through the mobile device or smart glasses, augmented reality markers may be overlaid onto the scene. These markers indicate whether the nearby WAPs are safe to use, or are compromised.

With the security agent, the security status of Wi-Fi networks can be identified, and the user can know whether the networks are safe, possibly compromised, or should be avoided outright, by way of illustrative and nonlimiting example. Augmented reality via an augmented reality layer may be applied to buildings and establishments in the user's surroundings. This gives the user an early warning of the reputation of nearby Wi-Fi networks, without ever having to connect to those Wi-Fi networks to discover their reputation.

In an example, the crowdsourcing model disclosed herein builds a database of good, bad, and in-between Wi-Fi networks. Information can be obtained from the many devices that already include security agents that may be configured to report data, such as anonymized data, to a global reputation database. This provides a crowdsourced reputation. The security agent may then scan Wi-Fi networks as the user comes into and out of range of the networks, or requests a heads-up display (HUD) in a virtual reality or augmented reality context. The user can then see at a glance which networks are safe or not safe to connect to. Furthermore, in at least some configurations, a security agent may also advise a user of safe or unsafe Wi-Fi networks via pop-up notifications, push notifications, or other notification mechanisms.

With the crowdsourced approach, the user need not connect to a network to determine if it is safe or not. Rather, the security agent can make an a priori determination of the safety of the network. Information about the Wi-Fi network need not remain local, but may be shared with the crowdsourced reputation engine. When information is uploaded to the crowdsourced reputation engine by millions or billions of users and devices, the crowdsourced reputation engine can build a directory of geo-tagged and name-tagged good and bad Wi-Fi networks.

A mobile device that accesses the cloud directory of geo-tagged Wi-Fi networks is useful to the end user. While this information can be displayed in the user interface (UI) of an augmented reality display, it can also be displayed in the UI of other apps, and/or through pop-ups and other notifications as the user comes close to Wi-Fi networks in the directory. Advantageously, augmented reality provides a frictionless way to present the information to the user.

Other useful methods of displaying information to the user include overlay of data on existing maps and navigation applications. For example, a user may be trying to decide where to go for lunch. The user may use a maps application to look up nearby cafés. According to a user configuration, the maps application displays not only nearby cafés, but also indicates whether the cafés have available Wi-Fi, the speed of the available Wi-Fi, whether the Wi-Fi is paid or free, if not free how much it costs, and the security reputation of the available Wi-Fi for those that have it. This provides the user with enhanced information to make the decision about which café to go to for lunch.

If the user is working on sensitive business matters, he may desire a café with available high-speed Wi-Fi with very high security, and because it is a work matter, the user may be less sensitive to whether there is a fee associated with using the Wi-Fi. On the other hand, for a user who simply wants to browse Facebook or watch movies, the user may be willing to trade off high security for higher bandwidth and/or less costly or free Wi-Fi. By overlaying the crowdsourced Wi-Fi reputation data on the map, the user can see at a glance which cafés best meet his requirements. In some cases, the user can even filter search results according to parameters such as availability of Wi-Fi, speed of available Wi-Fi, security of available Wi-Fi, and price of available Wi-Fi.

In yet another embodiment, businesses may be able to provide a certified reputation display with a badge that indicates the security reputation for the business. For example, if a business provides Wi-Fi and is certified by a security services provider to have high security, the user may be authorized to order or print a sign or placard with a particular badge indicating that the Wi-Fi for that business has been certified as secure by the security services provider.

Thus, a user walking and browsing stores, even without an augmented reality display, may be able to see at a glance, via the signs or placards, that a particular business has secure Wi-Fi. In some cases, a security agent may include a UI with a quick response (QR) scanner. The vendor may provide a QR code for the device to scan. After scanning the code, the security agent automatically verifies that the WAP has a high reputation for security, and connects to the certified secure WAP. This could include providing credentials, configuring the network, providing a simplified interface for displaying and accepting terms and conditions, and with an application programming interface (API) into a payment app such as Apple Pay, Google Pay, Venmo, PayPal, or similar, could also handle paying for Wi-Fi access.

In this example, businesses could print the QR code on the sign or placard so that users can easily connect to the Wi-Fi network by opening the security agent application, scanning the QR code, and being automatically connected to the network. In some cases, the sign or placard may provide relevant information such as the certified security reputation, the available bandwidth, the cost (if any) for connecting, or similar. The user's security agent can verify that the QR code is an authorized QR code provided by the security services provider, and that the certified network reputation is and remains valid. It may also use, for example, device location APIs to verify that the user's current location corresponds correctly to the purported WAP, and that the security configuration has not changed. Once the WAP has been verified, the agent may automatically configure the user's Wi-Fi to connect to that WAP.

In yet another embodiment, instead of a static display, the security services provider could provide dynamic displays such as small, flat-screen devices similar to tablets. These devices could connect to the security services provider in real time, via a secured wired, wireless, or mobile network that is resistant to tampering, and could provide a real time, updated reputation of the business or enterprise. The devices may also, for example, provide a QR code that a user can scan to connect to the Wi-Fi as described above. Businesses may wish to place these displays near the register, so that users are encouraged to complete purchases before scanning the QR code.

This can also help to alleviate the issue of businesses concerned about "freeloading" Wi-Fi users who use Wi-Fi without paying for goods or services. In this or in other cases, the business' QR code may not be provided on the placard or digital display, but may be printed on the user's receipt to ensure that the user completes the required purchase before connecting to the Wi-Fi. Furthermore, in cases where Wi-Fi is a paid service, the user may be permitted to pay for Wi-Fi while checking out with their other orders. In that case, the QR code may be a single-use QR code printed on the user's receipt that provides an individual and time-limited token for connecting to the Wi-Fi.

Many other embodiments of, and uses for, a crowdsourced Wi-Fi reputation network and ecosystem are possible, and are intended to be included within the scope of this specification.

Advantageously, with this crowdsourced Wi-Fi reputation, and with associated devices and systems, a user can simply look at available Wi-Fi networks and immediately see the security status of those networks. The user's device itself can then act as a node in the crowdsourcing ecosystem, as the user's device scans the local networks, determines how secure they are, and uploads anonymized information to the security services provider. This gives users an early warning of the reputation of Wi-Fi networks in their vicinity, without having to connect to those networks.

Advantageously, with this ecosystem only the initial users (e.g., the "seed users") of a particular WAP needs to connect to the network to establish its security reputation. In some cases, when the WAP does not have an established or reliable reputation (e.g., the user is a seed user), the security agent may initially sandbox the Wi-Fi connection so that its security can be established. The Wi-Fi connection is released from the sandbox after security is established, and optionally after the user verifies that he wants to connects (e.g., especially in the case that the connection is not well-secured).

After a seed user connects to the WAP, a security agent local to the device may scan the network and inform the user of whether it has a sufficient security reputation. This reputation, along with metadata about the Wi-Fi access point such as its speed, cost, security, name, location, and other metadata may then be uploaded to a cloud service where the data can be added to a geo-tagged global reputation database.

Once at least one seed user has connected to a network, additional users can see at least an initial reputation for the network before connecting to it. Because it is understood that the reputation of a network may evolve over time, the reputation may also be assigned an age and a confidence score. For example, if the reputation is based on a single connection made six months ago, then it may be desirable to connect again, and again scan the network to get a more up-to-date reputation. Reputations may age out as protocols change, as standards evolve, as the threat landscape evolves and new vulnerabilities are discovered, or as changes are made on the WAP itself. Thus, in some cases, a security agent may be configured to identify nearby WAPs that have aged or have low reliability reputations, and to establish provisional sandboxed connections to those WAPs to scan for their security parameters. In some cases, this does not involve any user interaction, but rather the security agent may do it automatically as a means of keeping its reputations for WAPs up-to-date and reliable. Because this is a sandboxed connection, it does not expose any personal user data, and may provide only dummy data to the WAP while provisionally connecting for testing purposes.

Using embodiments of this ecosystem, a user can immediately look at a building, an establishment, a hallway in a shopping mall, or some other area and see the reputation of public WAPs via augmented reality, sign, placard, digital display, or other display. If the user does not trust the connection, then she may choose a different establishment. If the user chooses to trust the establishment, then the establishment may also provide a simplified means for connecting to the network, such as via QR code or similar.

A system and method for providing crowdsourced reputations for wireless networks will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is an illustration of a wireless network ecosystem 100. In this example, wireless network ecosystem 100 includes a user operating an electronic device and walking in a public space, where she may see that a number of wireless networks are available. As the user views her surroundings through her mobile device or smart glasses, augmented reality markers may be overlaid onto the scene. These markers may indicate whether the Wi-Fi nearby is safe to use, is known to be compromised, or has an unknown reputation.

For example, if the user is operating a smartphone, she may open an app on her smartphone that uses the camera to show her the hallway that she is walking in. For example, this hallway may be in an airport, shopping mall, or in any other suitable place. Furthermore, the user can be outdoors or even looking at maps online for a place that she is planning to go. In some cases, the user may also have provided her phone with certain preferences, such as preferred bandwidth, preferences for payment options, or other preference information.

The smartphone may use GPS markers or map data to identify the user's current or preferred location. For example, if the user is walking down a hallway, then location services may be used to determine with a high degree of accuracy exactly where the user is, globally. If the user is browsing a map for planning a future trip, then geographic information systems (GIS) data may be used to identify the desired location.

The user's phone may query a cloud-based reputation service for nearby Wi-Fi hotspots or WAPs, along with reputation data for those WAPs. The augmented reality display 101 may then overlay onto the camera image augmented reality markers that identify available nearby WAPs, and also display metadata for those WAPs, including reputation data.

In this case, WAP 104 has been previously scanned and found to be safe and reliable. Furthermore, WAP 104 may meet other preference requirements for the user. In this case, WAP 104 is for a café. Note that the establishments illustrated in this FIGURE may appear to be similar to certain real-world operating concerns. This is not to imply a reputation for reliability or non-reliability for those concerns or the WAPs that they operate, but rather simply to illustrate operative features of the present disclosure.

The augmented reality display that overlays data for WAP 104 may also provide additional metadata, such as the name of the establishment, and an easily recognizable logo or other identifier. This can help the user visually identify at a glance which WAPs are available. This may be important, because the user may have personal preferences, such as a preference between coffee shop 108 and coffee shop 112. In some cases, heuristic data and/or machine learning algorithms may be used to learn user preferences over time, and further weight WAP scores according to those user preferences.

This ecosystem enables the end user to easily view available Wi-Fi networks, and to ascertain their desirability.

Figure 2:
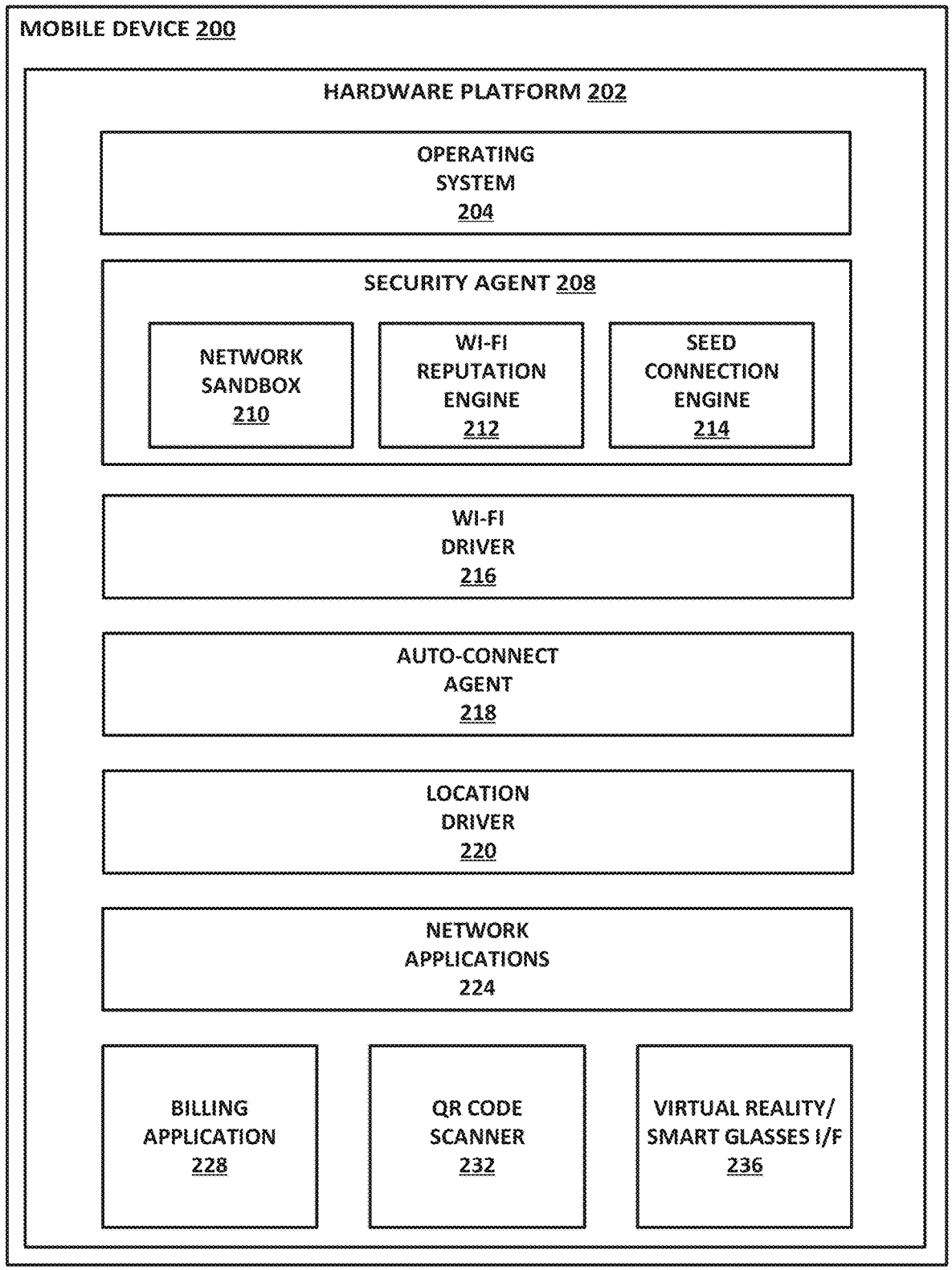
FIG. 2 is a block diagram of a mobile device.

FIG. 2 is a block diagram of a mobile device 200. Mobile device 200 may be, for example, a smartphone, a tablet, or any other suitable computing device. In some cases, mobile device 200 may connect to a virtual reality display, virtual reality glasses, or other auxiliary display that can help to provide the augmented reality services discussed herein.

In this illustration, mobile device 200 is built upon a hardware platform 202. Hardware platform 202 may be an example of one of the hardware platforms disclosed, for example, in FIG. 12, 13, or 14, below.

In particular, hardware platform 202 may include at least a processor and a memory. The processor may be able to execute instructions from the memory.

In this example, running on hardware platform 202 are an operating system 204, a security agent 208, a Wi-Fi driver 216, an auto connect agent 218, a location driver 220, network applications 224, a billing application 228, a QR code scanner 232, and a virtual reality or smart glasses interface 236. These blocks are provided by way of illustrative and nonlimiting example, only. Not every mobile device will provide all of these functions, and not all of these functions are required to practice every embodiment of this specification. Furthermore, mobile device 200 may have additional functions and elements that are not disclosed herein.

In general, the blocks illustrated herein may be software modules or functions, or they may be provided otherwise, such as in firmware, hardware, special analog and/or digital circuitry, microcode instructions or hardware instructions, or any combination thereof.

Operating system 204 may be, for example, a suitable mobile operating system such as Android or iOS. Other mobile devices may use different operating systems, and any suitable operating system will provide the appropriate hardware and software drivers to operate mobile device 200.

Security agent 208 may be a software module such as McAfee Mobile Security, or some other software solution. Security agent 208 provides security services to mobile device 200, including security for mobile networks. To this end, security agent 208 includes a Wi-Fi reputation engine 212 and a seed connection engine 214.

Wi-Fi reputation engine 212 may perform functions as illustrated in this specification, including querying a cloud-based reputation service for reputations of nearby WAPs, or other wireless networks. Wi-Fi reputation engine 212 may also include logic to parse the reputations provided by the cloud-based reputation service, and to generate a display including augmented reality (AR) overlays onto a virtual reality display. As discussed above, the AR overlays can provide information about nearby WAPs, including security reputations and other metadata that may be useful in helping the user to select a network to connect to.

Security agent 208 also includes a seed connection engine 214. In some cases, mobile device 200 may identify nearby WAPs, but they may not have a known or suitable reputation. For example, all of the nearby WAPs may have unknown reputations, or some of the nearby WAPs may have known reputations that are unacceptable to the user, while others have unknown reputations. Unacceptability could be driven by security factors as provided by a cloud-based reputation service, or it could be based simply on personal user preference, such as the user not wanting to patronize a certain establishment. In yet another example, the user may simply want to patronize a particular establishment, but that establishment does not have a known reliable reputation.

In the case that the user decides to connect to a Wi-Fi network without a known reliable reputation, seed connection engine 214 may initially provide the connection. Seed connection engine 214 may connect to the unknown WAP and scan it for security parameters. These security parameters may be uploaded to the cloud-based reputation provider, and the connection may be sandboxed until the user has verified that the WAP has an appropriate level of security and is otherwise desirable. This seed reputation may then be used as a baseline for future devices that wish to connect to that particular WAP.

Another use for seed connection engine 214 is to rescan or verify a previously computed reputation. For example, the cloud-based reputation provider may wish to verify a WAP's reputation periodically, such as once a day, once a week, several times a day, or on some other schedule. In that case, the cloud-based reputation service provider may instruct seed connection engine 214 to make a sandboxed seed connection to the WAP, to reverify or recertify the security parameters for that WAP. This ongoing verification may happen transparently to the user, and is useful in maintaining a good reputation database. Simply scanning a WAP once and then assuming that its configuration will remain unchanged indefinitely may not be considered a best security practice.

Network sandbox 210 may be used to sandbox any network connection that is provisional. The connection may be provisional because it is being used solely for the purpose of re-verifying a WAP that has an established security reputation, or it may be used to provide initial protection for a WAP that is establishing a first or seed connection, and cannot yet be trusted.

Wi-Fi driver 216 may provide the necessary hardware, software, and/or firmware to provide wireless network connectivity to mobile device 200. This may include, for example, 802.11 "g" or "n" network standards, or any other similar network standard. This could also include other wireless communication protocols, such as Bluetooth, radio frequency (RF), or other wireless networking protocols that may be developed in the future.

Auto connect agent 218 may provide connections to Wi-Fi services on an automated basis. For example, in some cases, the user may wish to allow mobile device 200 the ability to automatically connect to WAPs when they are in range. This provides convenience for the user, and removes the user from the need of having to always manually select a Wi-Fi network. In some cases, the user may provide a list of criteria, such as a minimum acceptable security rating, desirable payment terms, desirable bandwidth, desirable connection reliability, and other factors. As the user comes into range of various WAPs, auto connect agent 218 may operate Wi-Fi reputation engine 212 to query a cloud-based reputation server to determine the reputations of nearby networks. Auto connect agent 218 may then assign a composite score to each network based on security ratings and user preferences, and then connect to the nearest network with the best composite score. In other cases, if WAPs have similar or identical scores, or if there are a plurality of WAPs above an acceptable threshold, auto connect agent 218 may select a WAP at random from among the acceptable WAPs.

Location driver 220 may include hardware, software, and/or firmware to provide location services. This could include, for example, a GPS receiver, and other hardware and software combinations that commonly are used to refine a user's location, such as triangulating off of nearby cell towers and/or WAPs. Location driver 220 in modern practice is capable of providing mobile device 200 a highly precise (on the order of inches) global position for mobile device 200. This is useful in requesting and/or providing geo-tagged information, such as to a reputation services provider. It is also useful in operating a maps location, or identifying available nearby WAPs.

Network applications 224 include any number of applications that may need to access the network once the user has connected. This can include, for example, a web browser, e-mail application, instant messaging, social networking applications, online banking applications, news applications, or any other application that may need to access the network. Networking applications 224 benefit from secure network connections provided by security agent 208, and in some cases, from the ease and automation of auto connect agent 218.

Billing application 228 may be an application such as PayPal, Venmo, Apple Pay, Samsung Pay, Android Pay, or any other payment application or billing application that a user can operate to remit payment for goods and services. In some cases, security agent 208 and/or auto connect agent 218 may have an API into billing application 228. The API provides these other applications with the ability to interact with billing application 228. This can, for example, be used to automate the process of paying for paid WAPs, or otherwise providing paid extras for mobile device 200 and its user.

QR code scanner 232 may be used in embodiments where QR codes are used to automate Wi-Fi connections. For example, examples are discussed above in which an establishment posts a sign or placard with a QR code at an entrance or at some other convenient place, such as in front of a register, or in cases where a one-time or limited use Wi-Fi connection is provided as a paid or courtesy extra with the user's order, and printed for example on the user's receipt. QR code scanner 232 may be used to scan a QR code that provides information to connect to a Wi-Fi network. An appropriate agent such as auto connect agent 218, or some other agent, may be used to then complete the automated connection and connect the user to Wi-Fi.

Virtual reality or smart glasses interface 236 provides an interface and/or APIs into a virtual reality display. This could be an on-screen display of AR, such as one provided by the user's camera on a smartphone or tablet. This is used, for example, in mixed reality video games where the videogame is overlaid on the actual scene as observed from the user's camera. In this case, instead of a game, the overlay includes available WAPs and their reputations, as provided by a cloud-based reputation services provider. In other cases, the interface may connect to smart glasses or to a virtual reality display, in which case the user may actually wear the display, and the interface may provide an AR overlay onto the user's vision.

Figure 3:
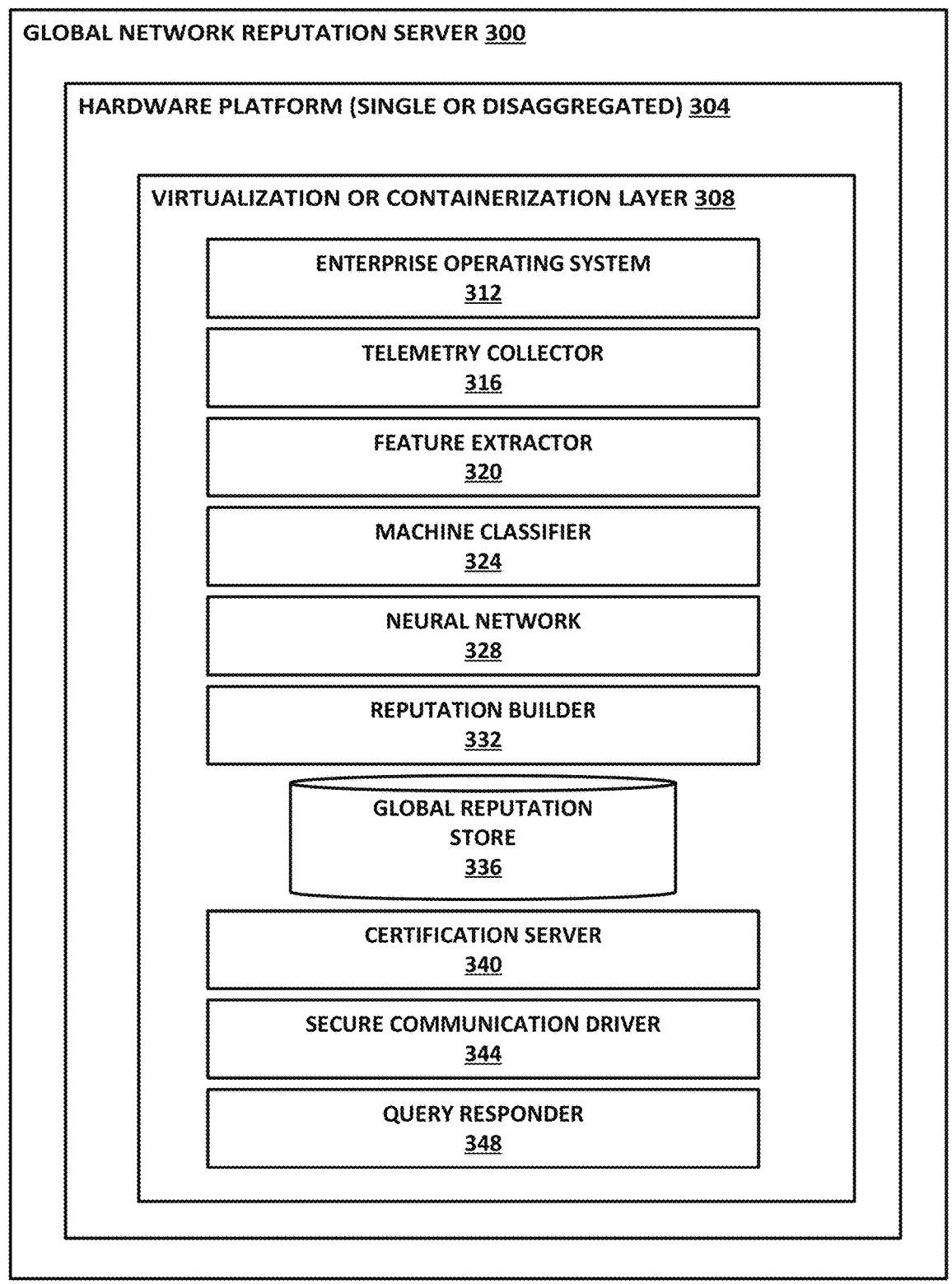
FIG. 3 is a block diagram of a global network reputation server.

FIG. 3 is a block diagram of a global network reputation server 300. As in the case of mobile device 200, global network reputation server 300 is provided on a hardware platform 304. However, in the case of global network reputation server 300, it is noted that the hardware platform could be a single hardware platform, such as a single rackmount server, or a disaggregated hardware platform such as disaggregated resources provided on different hardware devices in the same rack, or on different racks.

In some cases, hardware platform 304 may operate a virtualization or containerization layer 308. The virtualization or containerization layer provides a guest environment, wherein the actual functions operate.

Within virtualization or containerization layer 308, a number of modules may run. For example, in this case, there is an enterprise operating system 312. This could be, for example, an enterprise Linux operating system, an enterprise Windows server operating system, or some other operating system. Although enterprise operating systems are the most common for usage in large data centers that are likely to provide a reputation server, this is a nonlimiting example. Furthermore, there are examples of this specification wherein global network reputation server 300 is provided on a single or multiple dedicated servers. In the case of multiple dedicated servers, a load balancer could be used to distribute traffic between a number of essentially identical servers that provide a similar function. Similar functionality can be provided by network function virtualization, in which the load balancer itself is a virtualized network function, and each instance of the global network reputation server is also a virtual machine.

A telemetry collector 316 is provided to collect telemetry from mobile devices. For example, a seed user may connect to a Wi-Fi network. Telemetry about the connected Wi-Fi network may be sent via the user's device to the cloud reputation service. This information can include, for example, the network location, the service set identifier (SSID), the basic service set identifier (BSSID), or other information about the network. The information may be aggregated as more seed users connect to the same network, and this aggregated information may be used to form the reputation for that Wi-Fi network.

Note that as various users connect to a WAP, they may have slightly different geolocations, as they may be at various points within or outside of the actual establishment providing the WAP. In cases where there are multiple geolocation tags for the same network, a composite location may be computed, for example, as a weighted average or centroid of the plurality of locations provided.

Global network reputation server 300 may also include functions for serving reputations and associated data. For example, a feature extractor 320 may be used to identify and extract features from metadata provided by mobile devices feeding telemetry to the server.

A machine classifier 324 may be used to classify the WAPs, such as by inferring reputation data from the collected telemetry. Optionally, machine classifier 324 could include a neural network 328, which may be used to provide artificial intelligence or other machine learning algorithms. This may depend on the complexity of the algorithm being applied. In some cases, a simple rules-based machine classifier could be used, particularly where there is a known set of features, and wherein the implications of each feature are essentially known. In cases where the set of features is not as well-known, or where it may be desirable to identify new features, or where it may be desirable to identify novel ways of evaluating the known features, then artificial intelligence such as a neural network may be used.

A reputation builder 332 collects reputation data from machine classifier 324, and builds an overall reputation for each identified WAP. This could be a single scalar security reputation, with any suitable level of granularity. Alternatively, this could be a multidimensional reputation that includes such factors as the security, the bandwidth, the cost, the reliability, or any other suitable factor. Optionally, these factors may be aggregated to provide a single scalar composite score, or they may be maintained as separate reputation scores. All of these reputation scores, whether individual, composite, or aggregate, may be stored in a global reputation store.

Global network reputation server 300 may also include a certification server 340. Certification server 340 may be used in embodiments such as those discussed above, in which the reputation service provides certificates to certain establishments that certify that their networks are secure and usable. In those cases, the establishments could provide a visible score even for users who do not have an AR display, and they may even provide an automated connection option, such as via a QR code or other. Certification server 340 may use a secure communication driver 344 to establish a secure communication channel with clients of the certification service. This ensures that these communications are not compromised, and that it is difficult for establishments to spoof a secure certification.

Global network reputation server 300 also includes a query responder 348. Query responder 348 responds to queries from endpoints for reputation services. For example, an endpoint may send to global network reputation server 300 a request for reputations with a geo-tagged location. Query responder 348 may query global reputation store 336 for nearby WAPs with known reputations, for example, within a certain threshold distance. Global network reputation server 300 then sends what it knows about the security state and other reputation data of those WAPs back to the client device. This allows the client device to overlay the security state of the device in an AR display on the device's screen or smart glasses. This enables the end user to know whether it is safe to connect to certain WAPs.

When a seed user device connects to a Wi-Fi network for the first time, or as a follow-on connection, the network may be scanned by security software on the endpoint device to determine if the network is compromised or is safe. Identification of the network may include, for example, the name of the network (e.g., SSID), the media access control (MAC) address of the network (e.g., BSSID), the physical location of the network (e.g., latitude/longitude), the network's security state, or other security information about the network. These data may be uploaded to global network reputation server 300 as telemetry from the client device. This means that multiple Wi-Fi networks may be identified via a crowdsourcing mechanism. The accuracy and reliability of this crowdsourcing mechanism improves as more users use the system and their devices also upload telemetry about the networks that they connect to. In some cases, mobile devices upload telemetry about their connections every time they connect, even if it is a known network. This is in contrast to embodiments where telemetry is collected only once, or where telemetry is collected periodically. The decision between collecting periodically or collecting continuously may depend on the number of users, the frequency of data, and the available bandwidth and processing power for processing the uploaded telemetry data in a particular embodiment.

In scoring a Wi-Fi or other WAP, reputation builder 332 may consider features such as:
1. Whether a network is a known good network, and if there are any recorded issues for that network. If the network is known and there are no recorded issues, then the network may receive a good score from reputation builder 332.
2. Networks that are not currently compromised, but that have a recorded history of security issues may be assigned a caution score by reputation builder 332.
3. Networks that are identified as compromised, or otherwise known to be compromised, may be assigned a bad score by reputation builder 332.

These are just three illustrative examples of possible inputs into a reputation matrix. As discussed above, many features could be extracted and used in building a reputation. In the aggregate, historical security information about the Wi-Fi network may be used to build up an overall reputation for the Wi-Fi network.

When global network reputation server 300 receives a request from a client device, query responder 348 may respond to the query. For example, the global network reputation server may be interrogated by a mobile device as the user roams or moves around within an area, such as a shopping mall, an airport, or some other location. If query responder 348 finds within global reputation store 336 information about nearby Wi-Fi networks, then these may be sent to a security agent running on the endpoint device. The endpoint software may then overlay AR markers to show the score or security hygiene rating of the networks near the user, or other desirability data. The user can then make an informed decision about whether to visit the establishment and/or connect to the Wi-Fi network.

In some embodiments, a security agent such as security agent 208 is configured to scan a Wi-Fi network or other WAP every time a mobile device connects to the Wi-Fi network. In some cases, the security agent is configured to automatically upload telemetry data to a global network reputation server, such as global network reputation server 300, every time a connection is made and a Wi-Fi network is scanned. This could include both the initial security scan for proper configuration, and could also include scanning or monitoring for evidence that a network has been compromised. For example, in the illustration of FIG. 1, unsafe WAP 112 may be unsafe not because the proprietor has misconfigured their Wi-Fi network, but rather because another device such as a honeypot is spoofing the signal and pretending to be associated with that proprietor. This may be detected by the security agent, for example, because the information such as SSID for the purported network does not match the known reputation data for the actual establishment. In other cases, other signs of network compromise may be detected and uploaded to the telemetry or cloud service.

As described above, when the security agent makes an initial connection to a Wi-Fi network, the connection may initially be sandboxed while the connection is scanned, and the user is then connected for real only when the security settings have been verified. In that case, the user may optionally be notified that the network scan has been performed and the network has been found to be suitable.

If, during the course of the connection, the network appears to be compromised or some other suspicious activity is detected, the user may be given the option to disconnect from the Wi-Fi network for their safety.

Because some existing mobile security products already have the ability to detect bad Wi-Fi networks, the telemetry data can be uploaded by many thousands of users to a global network reputation server. The global network reputation server can then be used as a cloud-based backend that can provide better and more reliable reputation data for various networks.

In determining that a network is risky, a reputation builder 332 of FIG. 3, a security agent 208 of FIG. 2, or any other suitable hardware or software agent may look at a number of factors. This could include, by way of illustrative and nonlimiting example, the following:
1. The network has no login or password requirement.
2. The network has no other screening process for connections.
3. The network has a weak or default password.
4. The network uses outdated security or encryption protocols such as wired equivalent privacy (WEP) or Wi-Fi protected access 1 (WPA1), instead of a more secure protocol such as Wi-Fi protected access 2 (WPA2).
5. The network has had a recorded compromise. For example, a security agent may detect attacks such as address resolution protocol (ARP) spoofing attacks. ARP spoofing is where the intruders try to listen in on network traffic, with the hope of obtaining passwords and other private or personal data. If a security agent identifies this type of attack, information can be uploaded to the cloud to help build the reputation of the network.

Over time, reputation builder 332 can aggregate reputation data and build a detailed view of public and private Wi-Fi networks. In some cases, historical views of this content may also be used to determine the reputation of a Wi-Fi network. For example, if the Wi-Fi network currently appears good, but historically it has had many instances of being compromised, this may be persuasive that the Wi-Fi network should nevertheless be identified as risky.

Wi-Fi network information uploaded to the cloud service may be geo-tagged using the location and/or capabilities of a mobile device. This ensures that the correct network in the correct location is being identified.

When query responder 348 queries global reputation store 336 for Wi-Fi networks, and when security agent 208 scans nearby networks for reliability, a number of factors may be used to accurately identify a network. This can include, for example:

1. Service set identifier (SSID)—This is the typical network name that is seen by an end user when choosing a network to connect to.
2. Basic service set identifier (BSSID)—This is the MAC address of the Wi-Fi network.
3. Geolocation tag—The geolocation tag may include the latitude and longitude of the network.

A combination of these three data may be used to identify the Wi-Fi network. The geolocation information may have appropriate tolerances to accommodate the fact that Wi-Fi routers or base stations may be moved from location to location inside the premises, and to accommodate the fact that users themselves may be at different distances from the router when querying or analyzing the router. In some cases, the security agent on a mobile device may be configured not to trust a Wi-Fi network unless it can determine that all three of these match appropriately.

Figure 4:
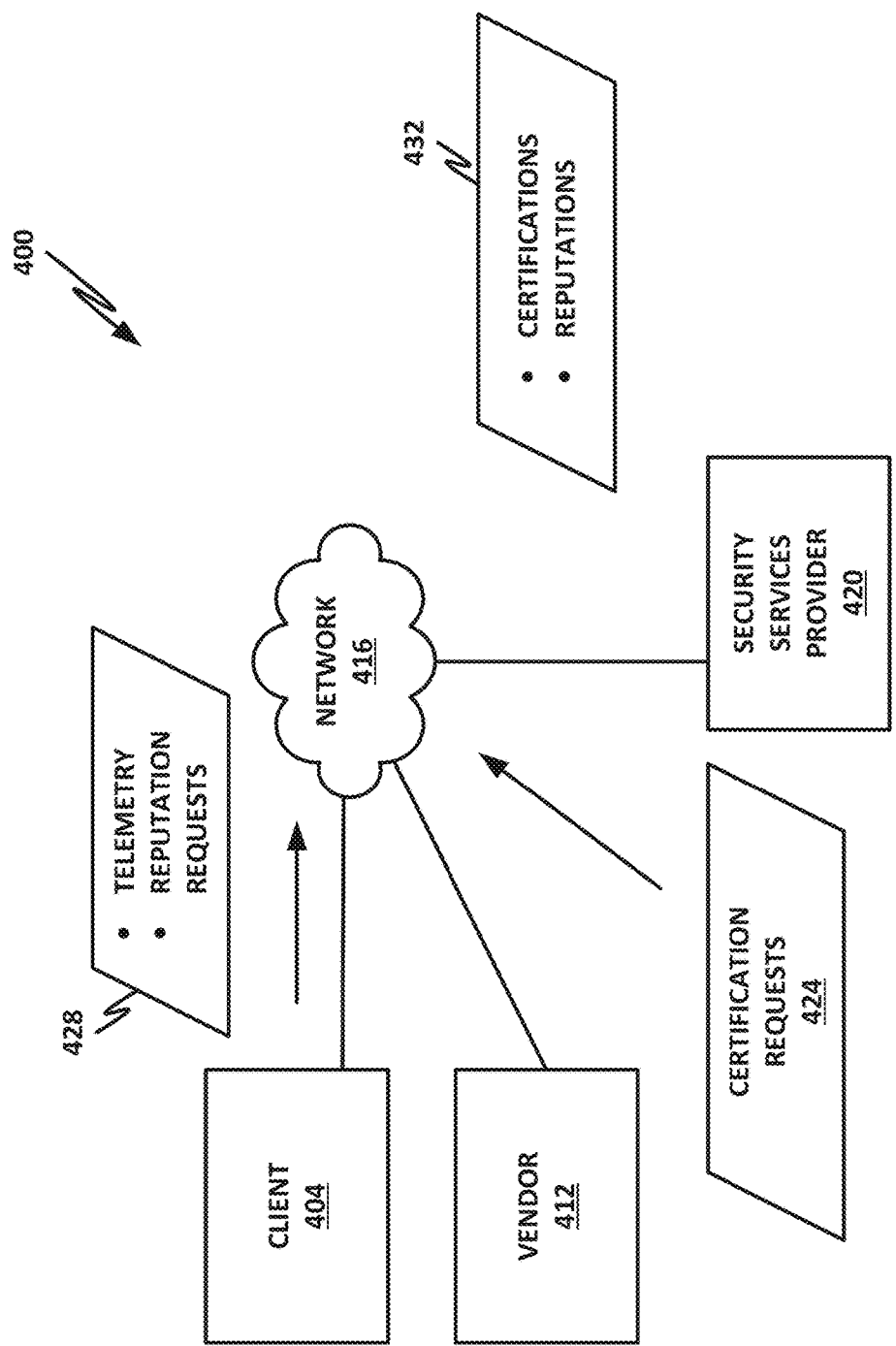
FIG. 4 is a block diagram of selected elements of a Wi-Fi network analysis ecosystem.

FIG. 4 is a block diagram of selected elements of a Wi-Fi network analysis ecosystem 400. In this case, a security services provider 420 connects via a network 416, such as the internet, to one or more clients 404 and optionally one or more vendors 412.

In this ecosystem, devices of clients 404 may provide data 428 to security services provider 420. These data may include, for example, telemetry collected from connected Wi-Fi networks, and reputation requests based on, for example, the user's geolocation.

Vendor 412 may, in some cases, provide certification requests 424 to security services provider 420. These certification requests may include information about the Wi-Fi configuration of vendor 412. The certification requests could be compared by security services provider 420 to telemetry data collected from clients 404, to provide certifications to vendor 412.

Security services provider 420 provides data 432 which may include, for example, certifications and reputations to vendor 412 and clients 404, respectively.

Figure 5:
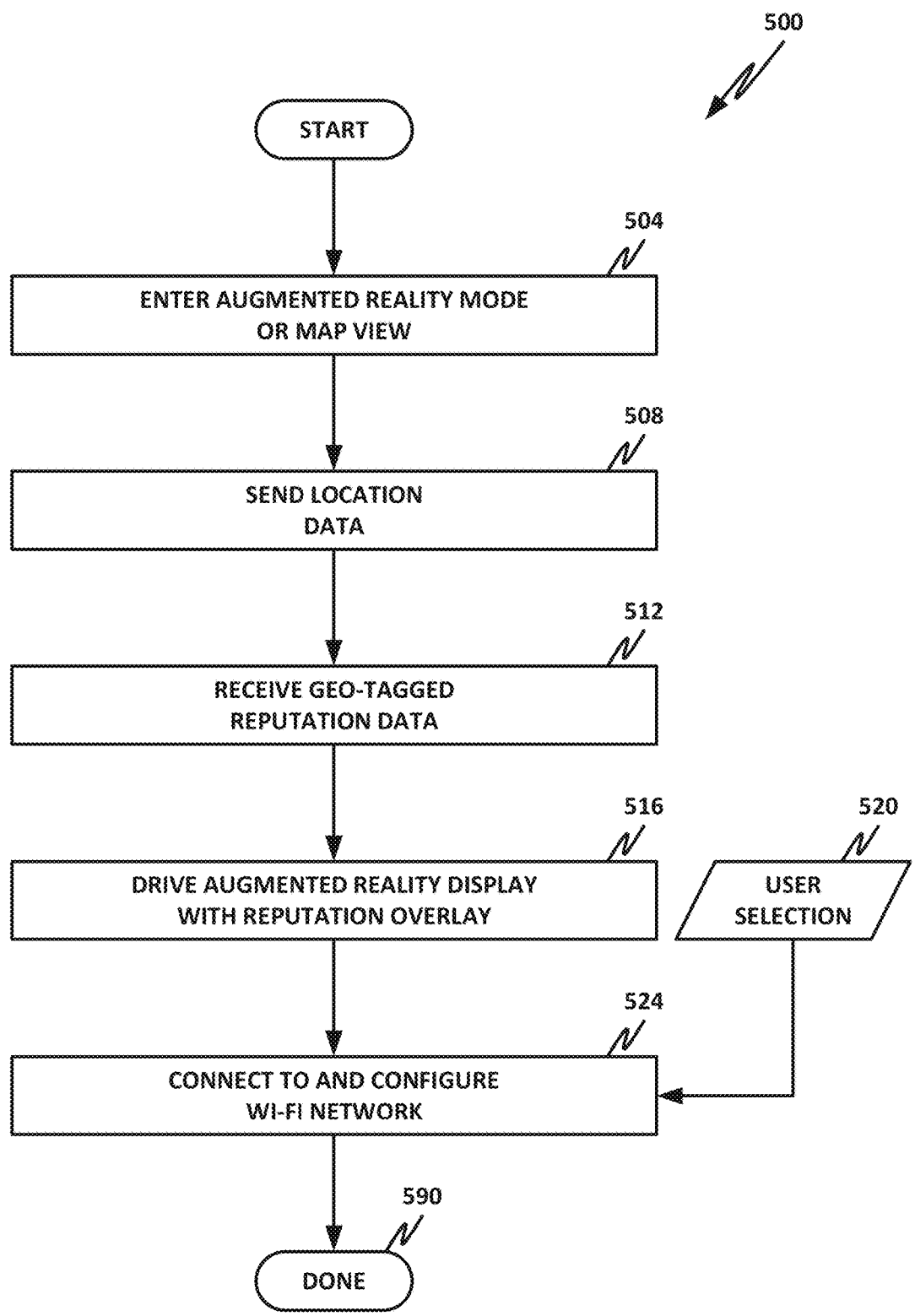
FIG. 5 is a flowchart of a method.

FIG. 5 is a flowchart of a method 500. In some embodiments, method 500 of FIG. 5 may be performed, for example, by security agent 208 of mobile device 200, or by any other appropriate module or agent.

In block 504, the agent enters AR mode or map view, or otherwise receives a trigger to enter an operative mode for providing reputations for WAPs. For example, the user may launch an app with an AR mode, may open a map view, or may take some other action to connect to smart glasses.

In block 508, the agent sends geolocation data to a cloud-based reputation service.

In block 512, the agent receives from the cloud-based reputation service a response that includes geo-tagged reputation data for known nearby WAPs.

In block 516, the agent may parse the response received from the cloud-based reputation service, and may optionally verify the identity of nearby WAPs, such as via SSID, BSSID, or other features. Once the agent has built a list of verified WAPs with known reputations, it may drive an AR display with a reputation overlay indicating the location, identity, and reputation for nearby WAPs, by way of illustrative example.

In block 524, the agent may receive a user selection 520, and then connect to and configure the Wi-Fi network. In some cases, the reputation data returned from the cloud-based reputation service may include instructions for connecting to one or more of the nearby WAPs. For example, WAPs with a reputation above a particular threshold may include connection instructions, which can ease the ability of the user to connect. In some cases, a "one-click" connection capability may be provided, in which the user simply clicks on the selected WAP on the AR display, and the device then automatically connects to that WAP. In some embodiments, this may include automatically loading a terms of use page in the background, and automatically accepting the terms of use. In other cases, a simplified terms of use interface could be provided, to display the terms of use page immediately to the user, so that the user can easily accept the terms of use and connect to the WAP.

In block 590, the method is done.

Figure 6:
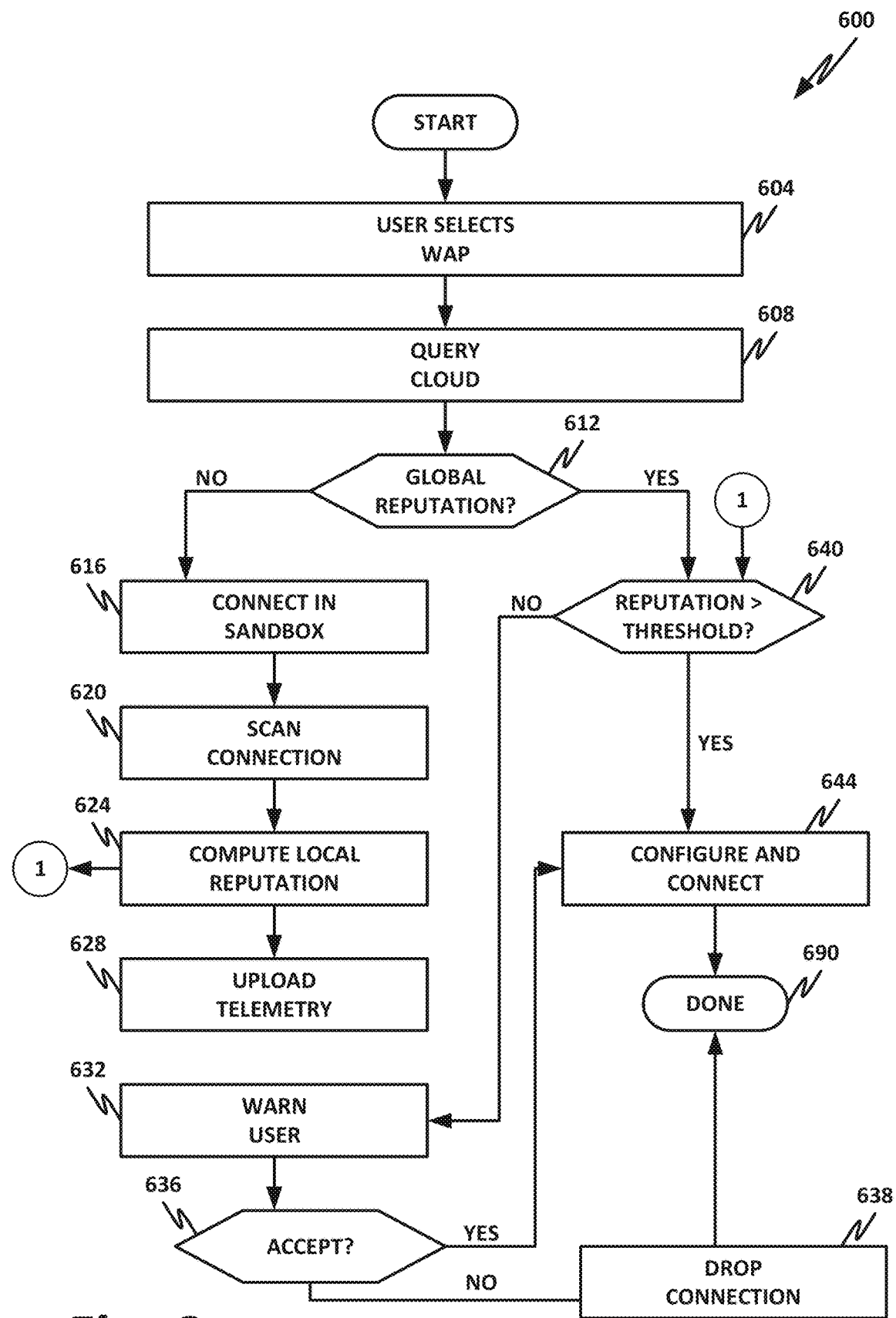
FIG. 6 is a flowchart of an additional method.

FIG. 6 is a flowchart of a method 600. Method 600 may be performed, for example, by a security agent 208 and/or an auto connect agent 218 of a mobile device 200, as illustrated in FIG. 2, or by any other appropriate agent or combination of agents.

In some embodiments, method 600 may be initiated when a user manually selects a WAP for connection without using an AR reputation display.

In block 604, the user selects a WAP. This could be, for example, by turning on Wi-Fi services on the device and then selecting the WAP from a list, by scanning a QR code to connect to the WAP, or by taking some other action to connect to the selected WAP.

In block 608, the agent queries the cloud reputation service for reputation data for the selected WAP.

In decision block 612, the agent determines whether the returned reputation data indicate that the selected WAP has an existing global reputation.

If the WAP does not have an existing global reputation, then in block 616, the agent connects to the WAP in a sandbox. This may be considered a provisional connection. The purpose of a provisional or sandboxed connection is to protect user security and privacy while the WAP is verified.

In block 620, the security agent or other agent may scan the connection for its security parameters, configuration, and other information.

In block 624, the agent may compute a local reputation for the WAP after the reputation scan. This could include the security, as well as other factors such as bandwidth, reliability, pay status, or similar.

In one of two parallel paths, control may flow from here via on-page connector 1 to decision block 640, which is described in more detail below.

In the second parallel path, in block 628, the agent may upload its telemetry data to the reputation cloud service. This provides a starting data point for this WAP in the reputation cloud service. In this case, the device may be acting as the seed device for this particular WAP. After this initial connection, future devices that connect to this WAP will have at least some reputation data to work from.

Returning to decision block 612, if the device has returned a global reputation, then control flows to decision block 640.

Decision block 640 may be reached either via decision block 612, or via on-page connector 1 from block 624.

In decision block 640, whether the reputation is locally computed, received from a global reputation service, or a combination of both, the agent determines whether the reputation is above a selected threshold. This could be a single scalar threshold, or it could be a multidimensional threshold. In the case of a multidimensional threshold, the reputation may need to be above a threshold for each dimension before the overall reputation is considered to be above the threshold. If any reputation dimension is below the threshold, then the entire reputation may be considered below the threshold. Other embodiments may use different mechanisms for comparing a reputation to a threshold.

If the reputation is above the threshold, then control flows to block 644, where the connection is allowed and configured. In block 690, the method is done.

If the reputation is not above the threshold, then in block 632, the agent may optionally warn the user of the suspicious connection. Whether control flows through block 632 may depend on the actual reputation. If the reputation is known bad, then control could flow directly to block 638. If the reputation is suspicious or unknown, then control can flow through block 632.

In decision block 636, the agent determines whether, after a warning, the user has confirmed or accepted the connection. For example, the agent warns the user that the WAP does not have a known or good reputation, and asks, "Does user want to connect, anyway?" If the user says yes, then in block 644, the agent configures the network and connects to it. In some embodiments, configuring and connecting to the network may include removing the connection from the sandboxed environment, and/or otherwise converting the connection from a provisional connection to a non-provisional connection.

Returning to decision block 636, if the user elects not to connect to the network, then in block 638, the agent may drop the network.

In block 690, the method is done.

Figure 7:
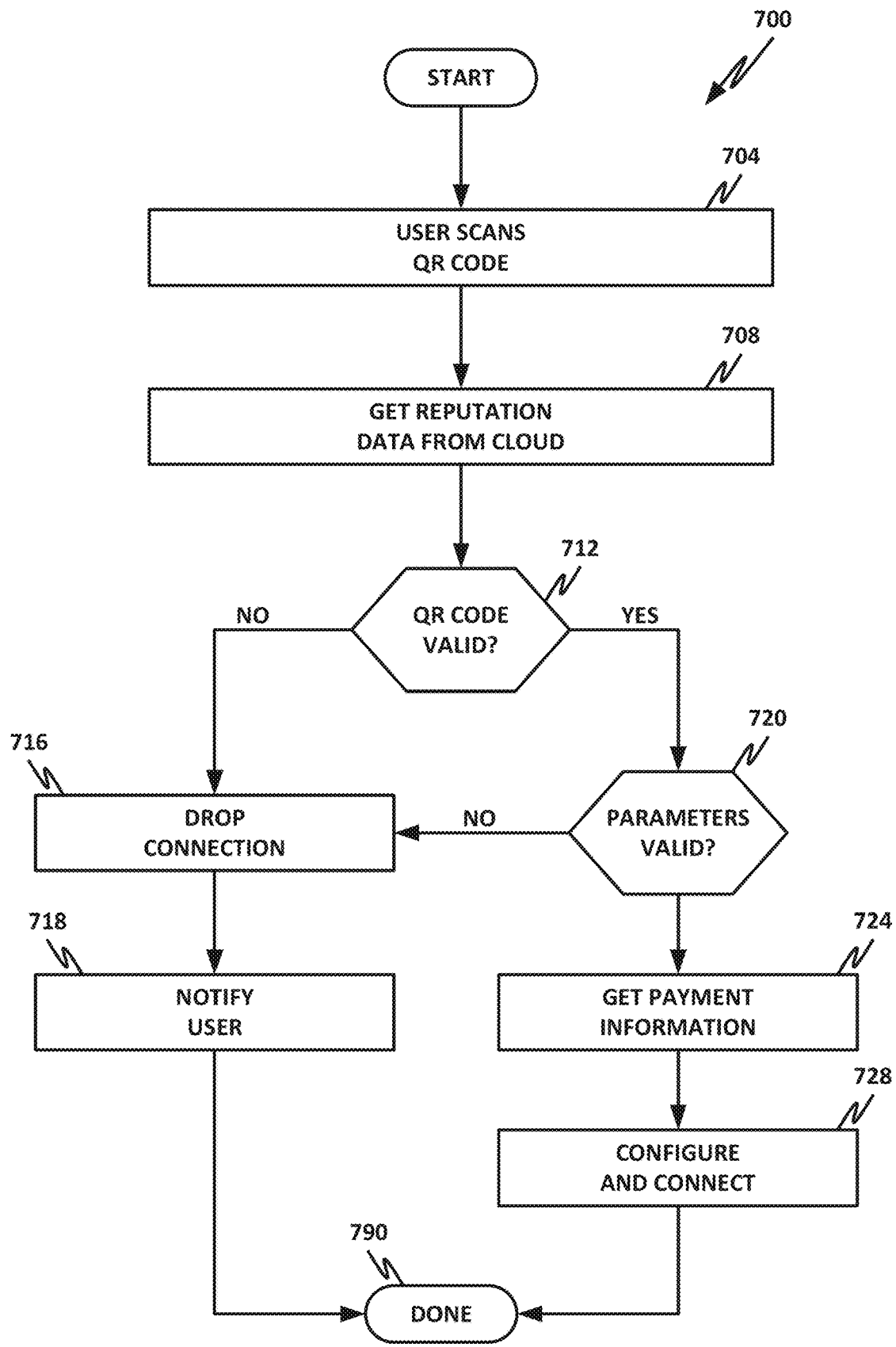
FIG. 7 is a flowchart of a further additional method.

FIG. 7 is a flowchart of a method 700. Method 700 may be performed, for example, by an auto connect agent 218 of a mobile device 200 of FIG. 2, or by some other appropriate agent or combination of agents.

FIG. 7 illustrates an embodiment in which a QR code scan is used to connect to the wireless network. This is provided as an illustrative example only, and other triggers or actions may be used to automatically connect to the network.

Starting in block 704, the user scans the QR code, or takes some other action to initiate the connection.

In block 708, the agent queries the cloud reputation service for data about the selected WAP. This could include whether the QR code is still valid and certified with the cloud service, the reputation of the WAP, and other metadata about the WAP.

In decision block 712, the agent may initially determine whether the QR code is still valid, with respect to the cloud-based reputation service. For example, if the WAP previously received a certification, but that certification has been revoked, then the QR code may no longer be valid with respect to the cloud-based reputation service.

If the QR code is not valid, then in block 716, the agent may drop the connection. In block 718, the agent may notify the user that they have attempted to connect to a WAP whose QR code is no longer valid with respect to the global cloud reputation service.

Returning to decision block 712, if the agent is able to validate the QR code, then in decision block 720, it may also determine whether the connection parameters are valid and consistent. For example, it may determine if the QR code is, indeed, for the purported WAP, if the geolocation data for the WAP matches geolocation data in the cloud service, if other metadata about the WAP is consistent or matching, and if the connection instructions are still valid.

If the parameters are not valid, then in block 716, the agent may drop the connection and control may flow as before.

Returning to decision block 720, if the parameters are valid, then optionally in block 724 the agent may get payment information, such as by querying a payment application or by operating an API into a payment application. One such payment application is illustrated as billing application 228 of FIG. 2.

In block 728, the agent may configure the network and connect to the WAP.

In block 790, the method is done.

Figure 8:
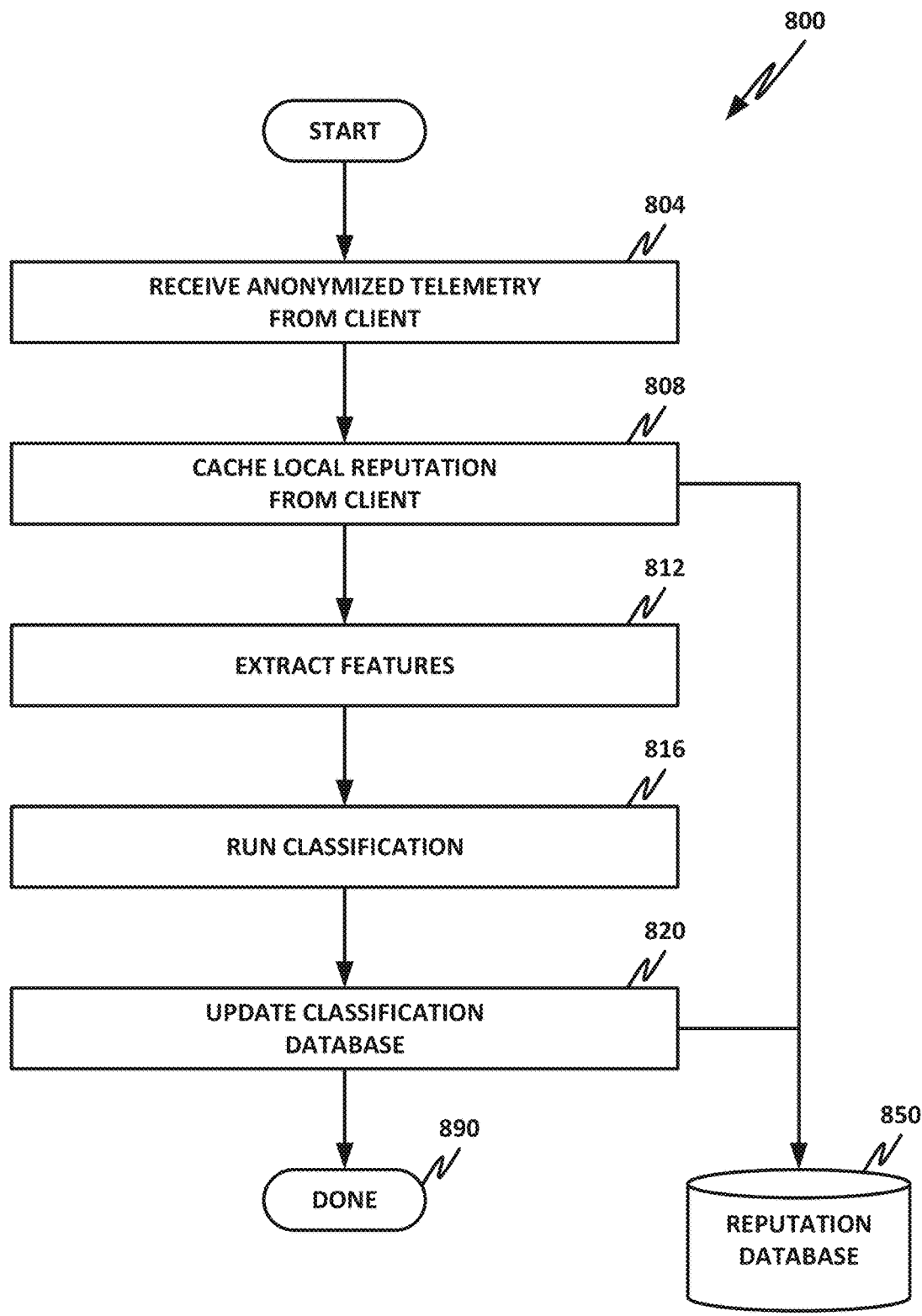
FIG. 8 is a flowchart of a further additional method.

FIG. 8 is a flowchart of a method 800. Method 800 may be performed, for example, by a combination of elements of FIG. 3. These can include telemetry collector 316, feature extractor 320, machine classifier 324, neural network 328, reputation builder 332, and/or global reputation store 336, by way of illustrative example.

Starting in block 804, the server receives anonymized telemetry data from one or more clients. This could include seed connections, and could also include updated telemetry from additional downstream connections to a particular WAP.

In block 808, the server may cache the telemetry received from the client devices in a reputation database 850. This can include local reputation data computed by the endpoints, and other metadata about the WAP.

In block 812, the server may extract features from the metadata of one or more objects in reputation database 850.

In block 816, the server may run classification on one or more objects in reputation database 850. For example, a machine classifier may be used to identify and classify features. Alternatively, heuristic data, a rule set, or other algorithm could be applied to provide classification for different WAPs.

In block 820, the server may update reputation database 850 with the classification data derived in block 816. This can be used for future reputation requests to help endpoints that are attempting to connect to a wireless network.

In block 890, the method is done.

Figure 9:
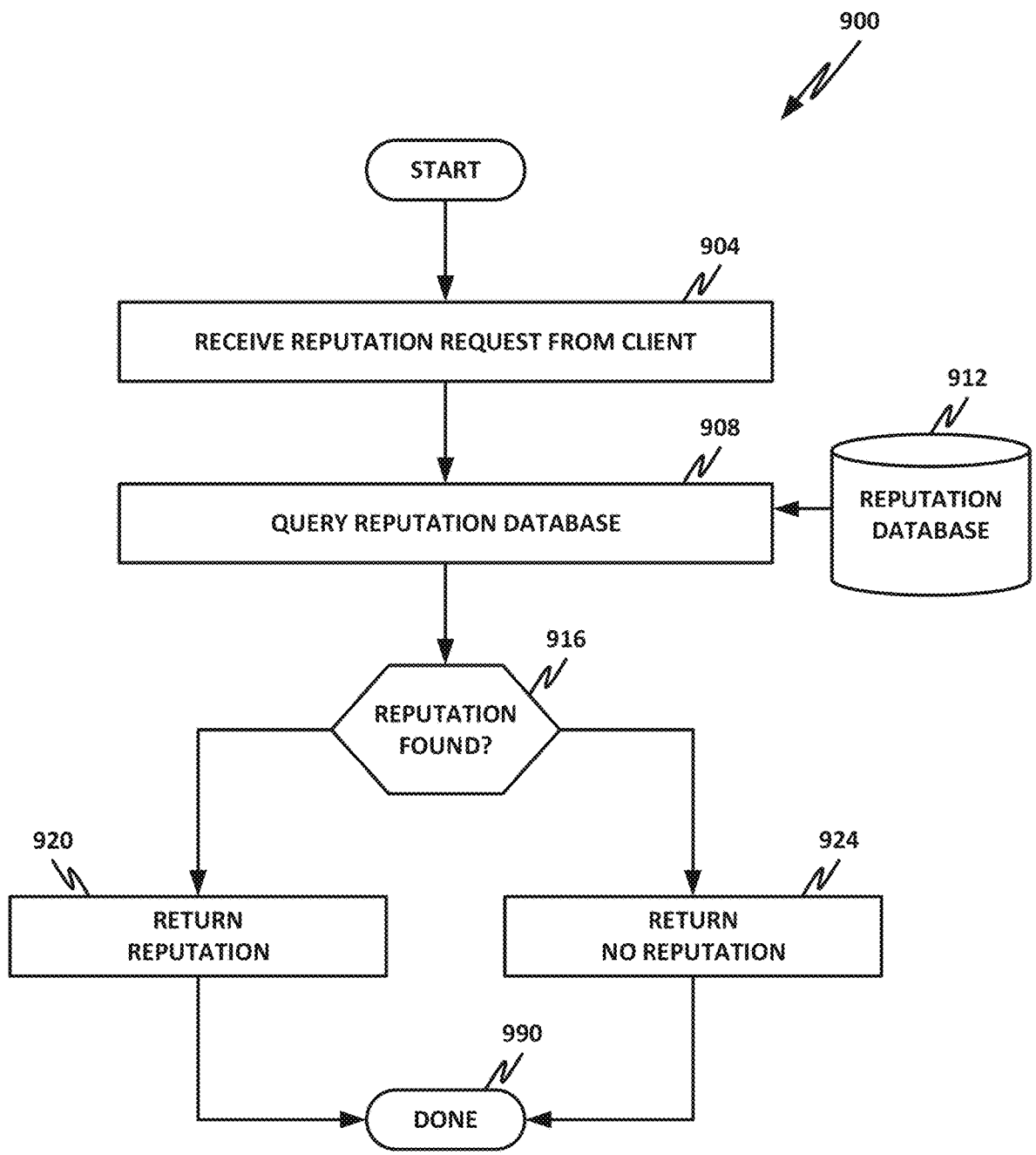
FIG. 9 is a flowchart of a further additional method.

FIG. 9 is a flowchart of a method 900. Method 900 may be performed, for example, by a certification server 340 of global network reputation server 300 of FIG. 3, including the use of secure communication driver 344, or any other appropriate agent or combination of agents.

Method 900 may be performed, for example, by a query responder 348 operating global reputation store 336, as illustrated in global network reputation server 300 of FIG. 3, or by any other appropriate agent or combination of agents.

Starting in block 904, the server receives a reputation request from a client device. This reputation request may include, for example, a geolocation for the device, with a request to return reputation data for one or more nearby WAPs. Alternatively, the reputation request could include a reputation request for a single WAP.

In block 908, the server queries a reputation database 912 for reputation data. This could include querying reputation database 912 with a geolocation, and searching for one or more WAPs that are nearby the geolocation. Alternatively, this could include querying reputation database 912 with the identity of a specific WAP, and requesting reputation data for that WAP.

In decision block 916, the server determines whether one or more reputation data were found for one or more WAPs, according to the query.

In block 924, if no reputation data are found, then the server may return to the client a message that no reputation data were found.

Returning to decision block 916, if reputation data were found, then in block 920, the server may return to the requesting client the requested reputation data. This may include reputation data and other metadata about one or more WAPs.

In block 990, the method is done.

Figure 10:
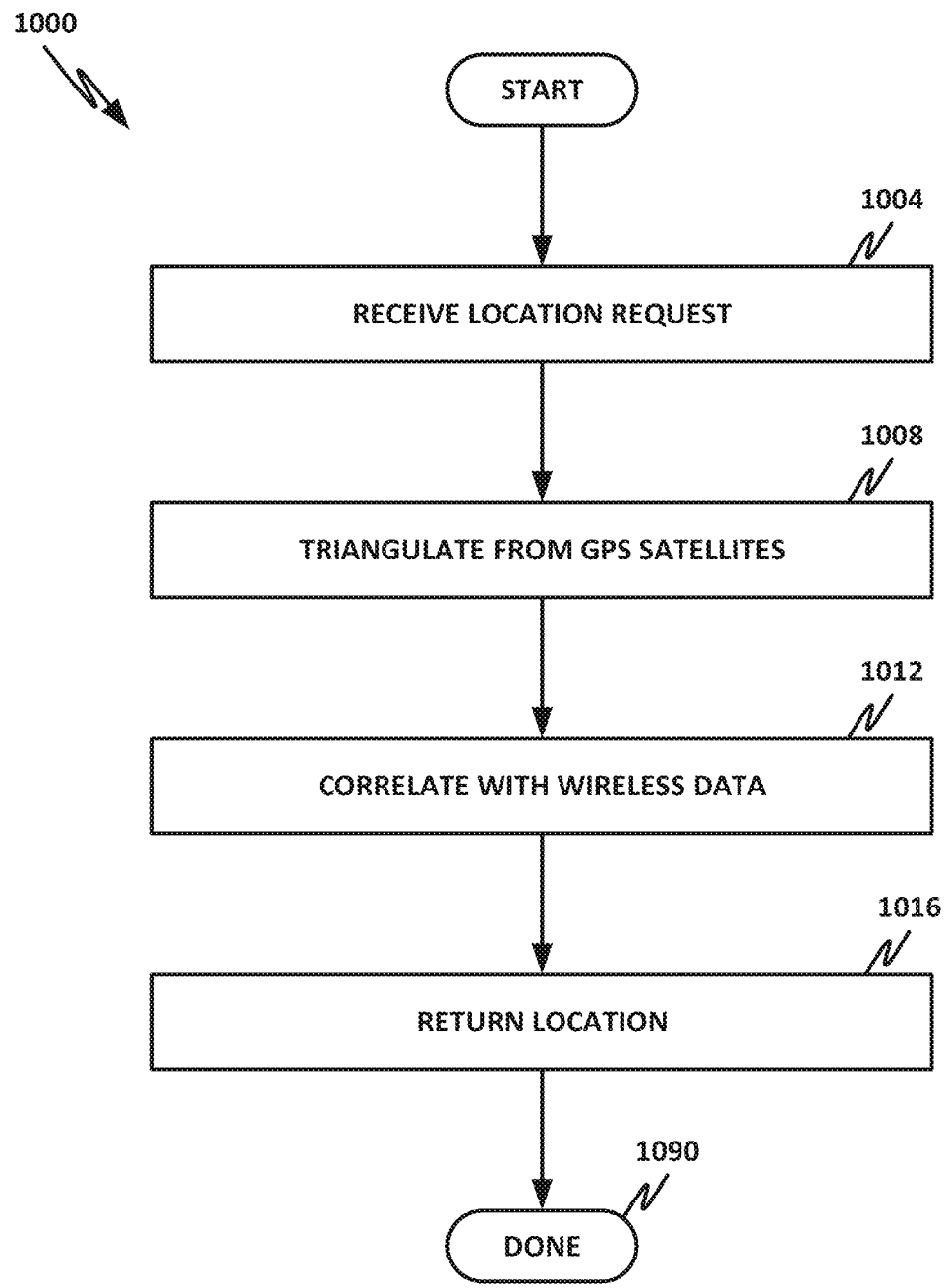
FIG. 10 is a flowchart of a further additional method.

FIG. 10 is a flowchart of a method 1000. Method 1000 may be performed, for example, by location driver 220, as illustrated in mobile device 200 of FIG. 2, or by any other appropriate agent or combination of agents.

Starting in block 1004, the agent receives a location request for the current device.

In block 1008, the agent may triangulate its position, such as by querying one or more GPS satellites and triangulating on that location.

In block 1012, the agent may further correlate data received from GPS satellites with wireless communication data. For example, the agent could triangulate off of nearby Wi-Fi networks, or off of nearby cell towers. This can help to improve the accuracy of the computed location.

In block 1016, the agent returns the computed location.

In block 1090, the method is done.

Figure 11:
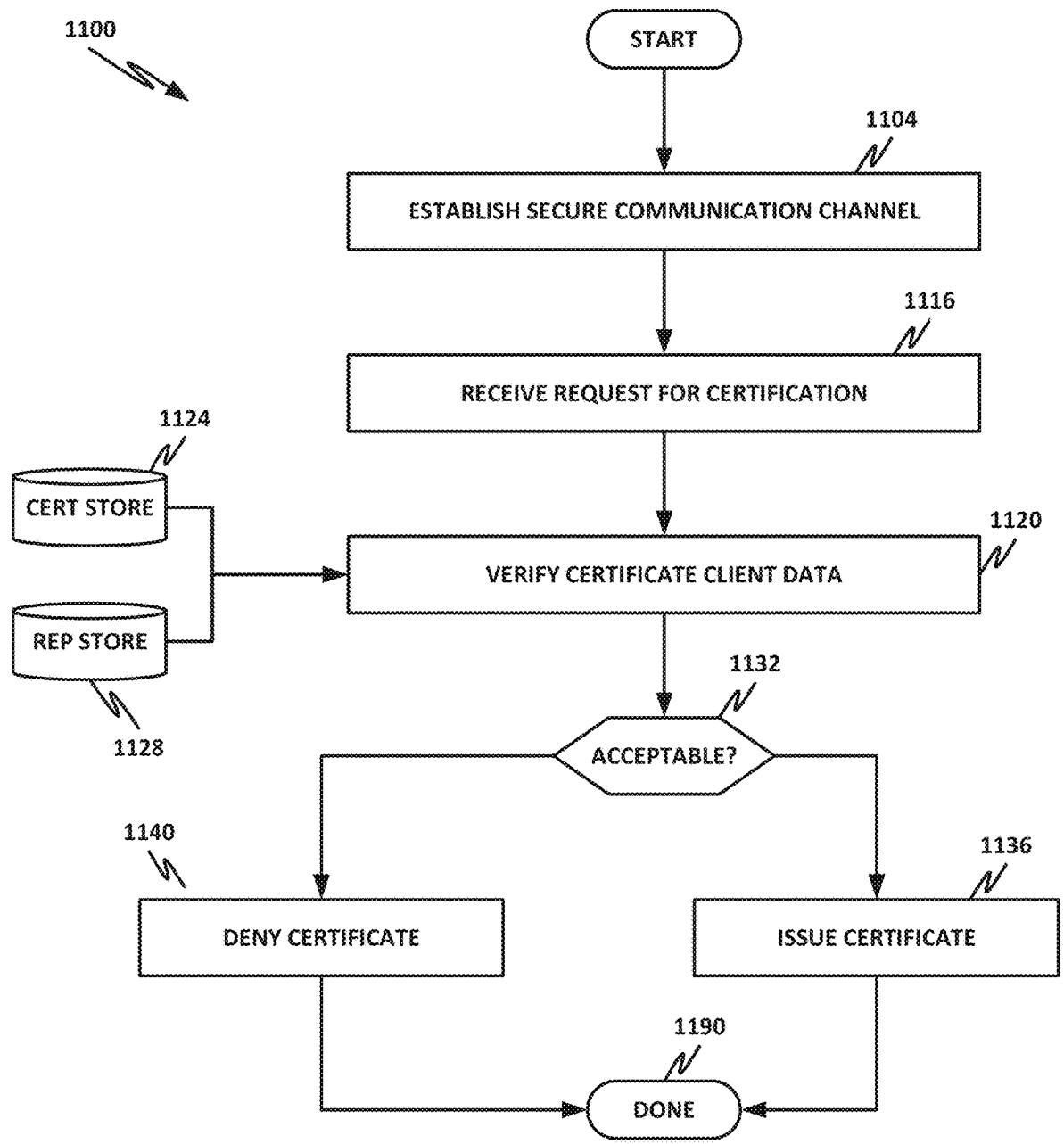
FIG. 11 is a block diagram illustration of a method.

FIG. 11 is a block diagram illustration of a method 1100. Method 1100 may be performed, for example, by certification server 340 of global network reputation server 300 of FIG. 3. Certification server 340 could optionally operate a secure communication driver 344.

In block 1104, the certification server establishes a secure communication channel with a certification client that is requesting certification, for example, for its Wi-Fi network.

In block 1116, the certification server receives from the certification client a request for a certificate. This request may include information such as configuration data for the wireless network that may be verified, and that may ensure the wireless network has a minimum acceptable security configuration.

In block 1120, the server verifies security data for the certification client. This could include querying a certificate store 1124, as well as optionally querying a global reputation store 1128. For example, if the client has an existing certificate in certificate store 1124, then the certificate may be updated. Global reputation store 1128 may be used to determine whether the client WAP has a suitable security reputation, regardless of its security configuration. For example, if the Wi-Fi network has a facially secure security configuration, but has a history of recent data leaks or compromises, this may be persuasive that the Wi-Fi network should not be certified. On the other hand, if the Wi-Fi network meets minimum security configuration standards, and has an acceptable security reputation, then it may be eligible for a new security certificate.

In decision block 1132, the server determines whether the client has an acceptable reputation score, and is therefore eligible for a security certificate.

In block 1136, if the client is eligible, then a certificate is issued.

In block 1140, if the client is not eligible, then the server denies the certificate.

In block 1190, the method is done.

Figure 12:
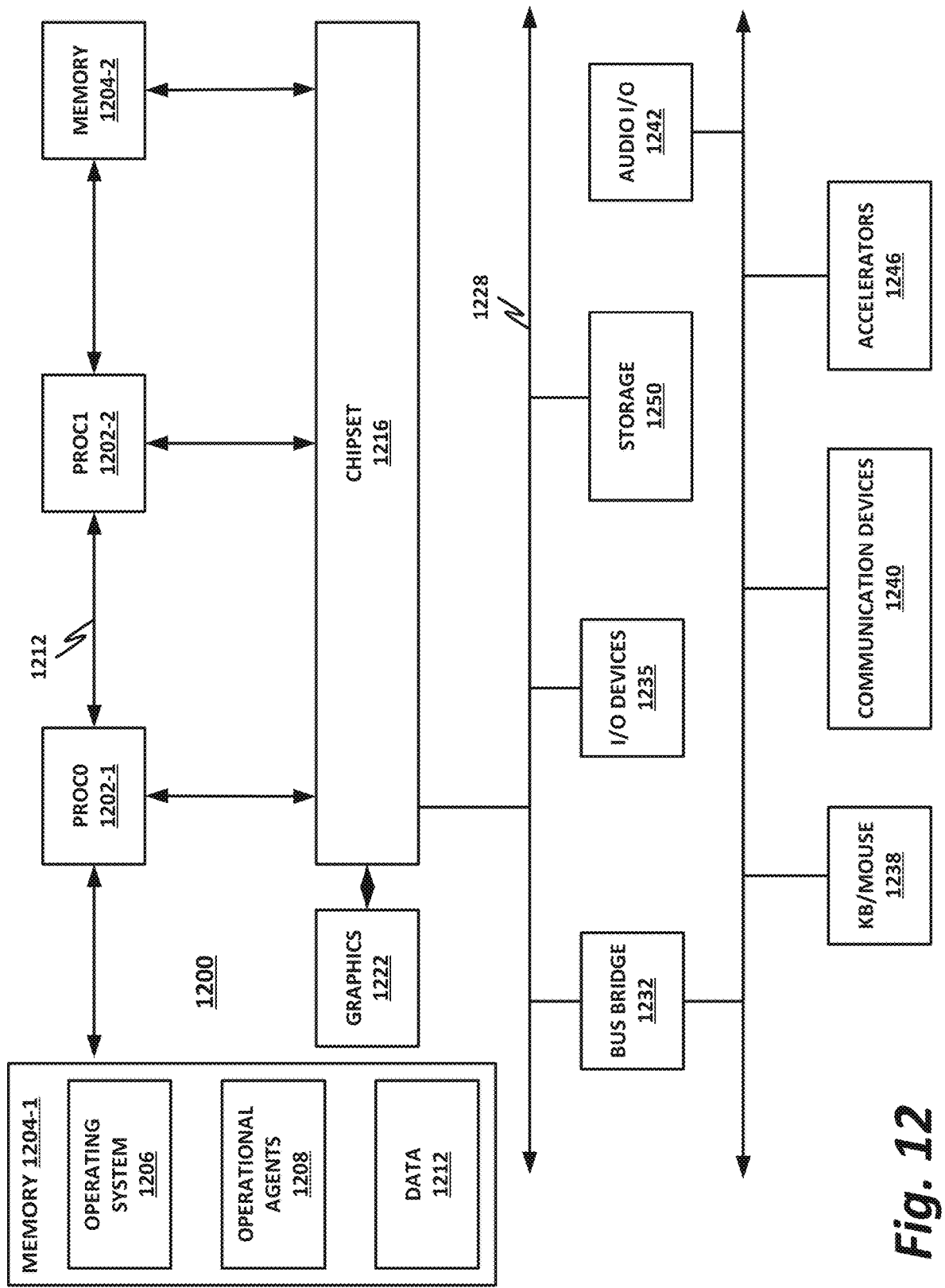
FIG. 12 is a block diagram illustrating selected elements of a hardware platform.

FIG. 12 is a block diagram illustrating a hardware platform 1200. In at least some embodiments, hardware platform 1200 may be configured or adapted to provide crowdsourced reputations for wireless networks, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1200, even though they may be scattered across a data center, or even located in different data centers.

Hardware platform 1200 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1200 is arranged in a point-to-point (PtP) configuration. This PtP configuration is popular for personal computer (PC) and server-type devices, although it is not so limited, and any other bus type may be used.

Hardware platform 1200 is an example of a platform that may be used to implement embodiments of the teachings of this specification. For example, instructions could be stored in storage 1250. Instructions could also be transmitted to the hardware platform in an ethereal form, such as via a network interface, or retrieved from another source via any suitable interconnect. Once received (from any source), the instructions may be loaded into memory 1204, and may then be executed by one or more processor 1202 to provide elements such as an operating system 1206, operational agents 1208, or data 1212.

Figure 14:
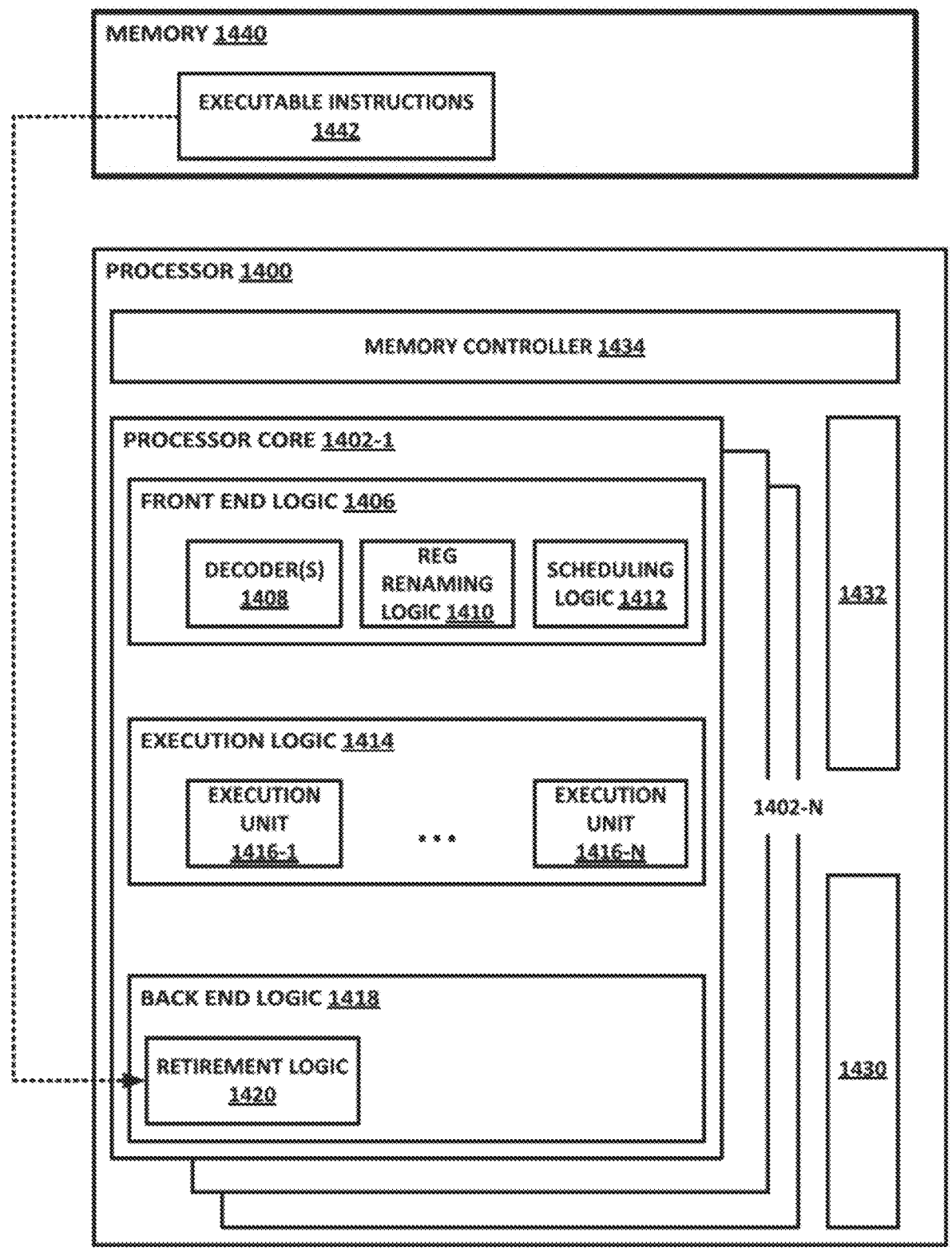
FIG. 14 is a block diagram of selected elements of a processor.

Hardware platform 1200 may include several processors 1202. For simplicity and clarity, only processors PROC0 1202-1 and PROC1 1202-2 are shown. Additional processors (such as 2, 4, 8, 16, 24, 32, 64, or 128 processors) may be provided as necessary, while in other embodiments, only one processor may be provided. Details of processors 1202 are not illustrated in this FIGURE, but one embodiment is illustrated in FIG. 14. Processors may have any number of cores, such as 1, 2, 4, 8, 16, 24, 32, 64, or 128 cores.

Processors 1202 may be any type of processor and may communicatively couple to chipset 1216 via, for example, PtP interfaces. Chipset 1216 may also exchange data with other elements, such as a high performance graphics adapter 1222. In alternative embodiments, any or all of the PtP links illustrated in FIG. 12 could be implemented as any type of bus, or other configuration rather than a PtP link. In various embodiments, chipset 1216 may reside on the same die or package as a processor 1202 or on one or more different dies or packages. Each chipset may support any suitable number of processors 1202. A chipset 1216 (which may be a chipset, uncore, Northbridge, Southbridge, or other suitable logic and circuitry) may also include one or more controllers to couple other components to one or more central processor units (CPUs).

Two memories, 1204-1 and 1204-2 are shown, connected to PROC0 1202-1 and PROC1 1202-2, respectively. As an example, each processor is shown connected to its memory in a direct memory access (DMA) configuration, though other memory architectures are possible, including ones in which memory 1204 communicates with processors 1202 via a bus. For example, some memories may be connected via a system bus, or in a data center, memory may be accessible in a remote DMA (RDMA) configuration.

Memory 1204 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1204 may be used for short, medium, and/or long-term storage. Memory 1204 may store any suitable data or information utilized by platform logic. In some embodiments, memory 1204 may also comprise storage for instructions that may be executed by the cores of processors 1202 or other processing elements (e.g., logic resident on chipsets 1216) to provide functionality.

In certain embodiments, memory 1204 may comprise a relatively low-latency volatile main memory, while storage 1250 may comprise a relatively higher-latency nonvolatile memory. However, memory 1204 and storage 1250 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1204 and storage 1250, for example, in a single physical memory device, and in other cases, memory 1204 and/or storage 1250 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1222 may be configured to provide a human-readable visual output, such as a command-line interface (CLI) or graphical desktop such as Microsoft Windows, Apple OSX desktop, or a Unix/Linux X Window System-based desktop. Graphics adapter 1222 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1222 may include a hardware graphics card, which may have its own memory and its own graphics processing unit (GPU).

Chipset 1216 may be in communication with a bus 1228 via an interface circuit. Bus 1228 may have one or more devices that communicate over it, such as a bus bridge 1232, I/O devices 1235, accelerators 1246, communication devices 1240, and a keyboard and/or mouse 1238, by way of nonlimiting example. In general terms, the elements of hardware platform 1200 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1240 can broadly include any communication not covered by a network interface and the various I/O devices described herein. This may include, for example, various universal serial bus (USB), FireWire, Lightning, or other serial or parallel devices that provide communications.

I/O Devices 1235 may be configured to interface with any auxiliary device that connects to hardware platform 1200 but that is not necessarily a part of the core architecture of hardware platform 1200. A peripheral may be operable to provide extended functionality to hardware platform 1200, and may or may not be wholly dependent on hardware platform 1200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1242 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1232 may be in communication with other devices such as a keyboard/mouse 1238 (or other input devices such as a touch screen, trackball, etc.), communication devices 1240 (such as modems, network interface devices, peripheral interfaces such as PCI or PCIe, or other types of communication devices that may communicate through a network), audio I/O 1242, data storage device 1250, and/or accelerators 1246. In alternative embodiments, any portions of the bus architectures could be implemented with one or more PtP links.

Operating system 1206 may be, for example, Microsoft Windows, Linux, UNIX, Mac OS X, iOS, MS-DOS, or an embedded or real time operating system (including embedded or real time flavors of the foregoing). In some embodiments, a hardware platform 1200 may function as a host platform for one or more guest systems that invoke application (e.g., operational agents 1208).

Operational agents 1208 may include one or more computing engines that may include one or more non-transitory, computer readable mediums having stored thereon executable instructions operable to instruct a processor to provide operational functions. At an appropriate time, such as upon booting hardware platform 1200 or upon a command from operating system 1206 or a user or security administrator, processor 1202 may retrieve a copy of the operational agent (or software portions thereof) from storage 1250 and load it into memory 1204. A processor 1202 may then iteratively execute the instructions of operational agents 1208 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1200 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), VPN, intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1200 may be virtualized, in particular the processor(s) and memory. For example, a virtualized environment may run on operating system 1206, or OS 1206 could be replaced with a hypervisor or virtual machine manager. In this configuration, a virtual machine running on hardware platform 1200 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 12 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 13. Such an SoC (and any other hardware platform disclosed herein) may include analog, digital, and/or mixed-signal, RF, or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 13:
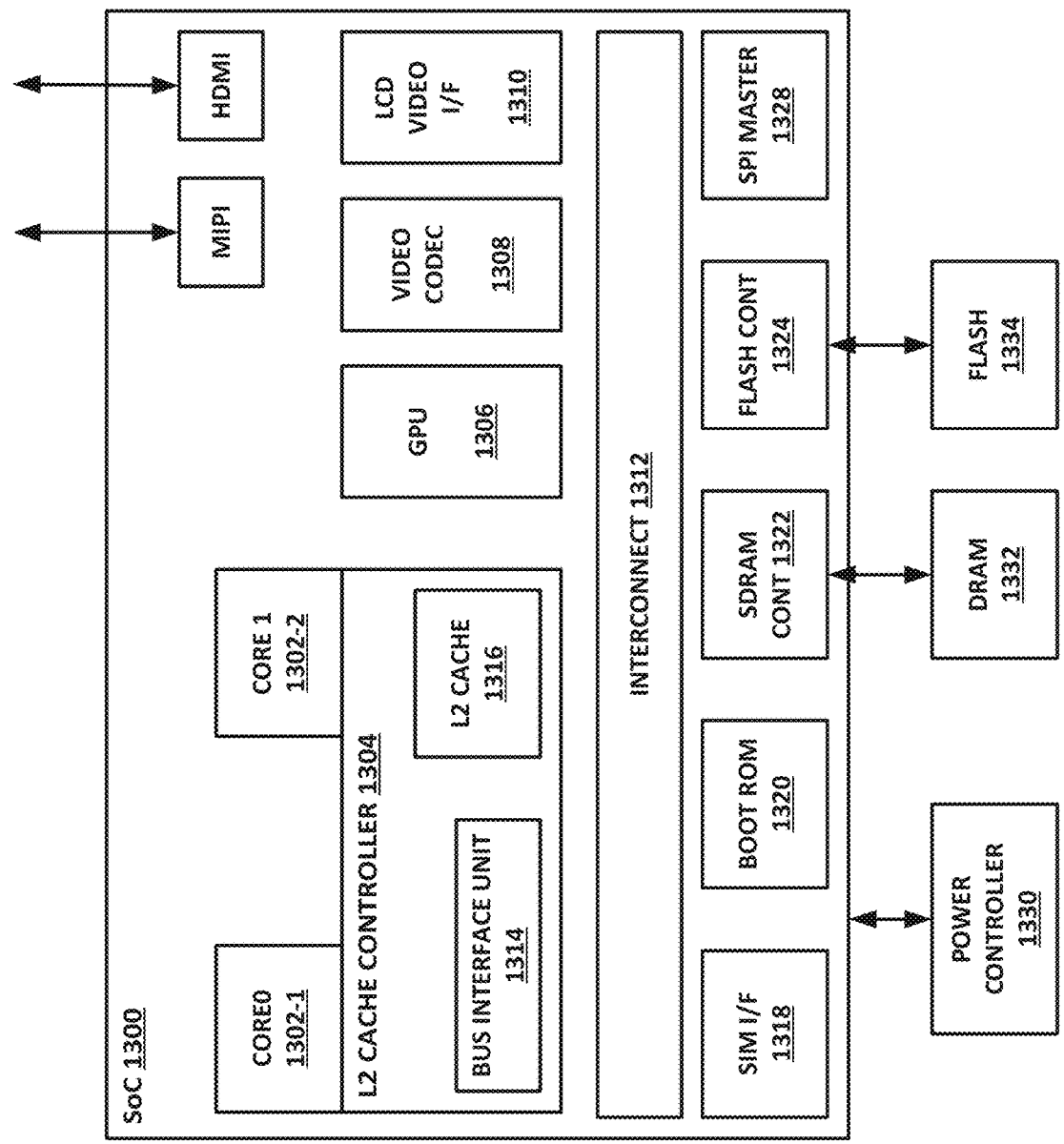
FIG. 13 is a block diagram of selected elements of a system-on-a-chip (SoC).

FIG. 13 is a block illustrating selected elements of an example SoC 1300. In at least some embodiments, SoC 1300 may be configured or adapted to provide crowdsourced reputations for wireless networks, according to the teachings of the present specification.

At least some of the teachings of the present specification may be embodied on an SoC 1300, or may be paired with an SoC 1300. SoC 1300 may include, or may be paired with, an advanced reduced instruction set computer machine (ARM) component. For example, SoC 1300 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 1300 could also be integrated into, for example, a PC, server, video processing components, laptop computer, notebook computer, netbook, or touch-enabled device.

As with hardware platform 1200 above, SoC 1300 may include multiple cores 1302-1 and 1302-2. In this illustrative example, SoC 1300 also includes an L2 cache control 1304, a GPU 1306, a video codec 1308, a liquid crystal display (LCD) I/F 1310 and an interconnect 1312. L2 cache control 1304 can include a bus interface unit 1314, a L2 cache 1316. Liquid crystal display (LCD) I/F 1310 may be associated with mobile industry processor interface (MIPI)/HDMI links that couple to an LCD.

SoC 1300 may also include a subscriber identity module (SIM) I/F 1318, a boot ROM 1320, a synchronous dynamic random access memory (SDRAM) controller 1322, a flash controller 1324, a serial peripheral interface (SPI) master 1328, a suitable power control 1330, a dynamic RAM (DRAM) 1332, and flash 1334. In addition, one or more embodiments include one or more communication capabilities, interfaces, and features such as instances of Bluetooth, a 3G modem, a GPS, and an 802.11 Wi-Fi.

Designers of integrated circuits such as SoC 1300 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 14 is a block diagram illustrating selected elements of a processor 1400. In at least some embodiments, processor 1400 may be configured or adapted to provide crowdsourced reputations for wireless networks, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1400 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1400 includes one or more processor cores 1402, including core 1402-1-1402-N. Cores 1402 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1400 may include at least one shared cache 1430, which may be treated logically as part of memory 1440. Memory 1440 may include executable instructions 1442, as illustrated. Caches 1430 may be filled according to known caching techniques, and may store instructions and/or data that may be used by one or more components of processor 1400.

Processor 1400 may include an integrated memory controller (MC) 1434, to communicate with memory 1440. Memory controller 1434 may include logic and circuitry to interface with memory 1440, and may also include a cache controller to handle filling and evicting instructions and data to and from cache 1430.

By way of example, each core 1402 may include front-end logic 1406, execution logic 1414, and backend logic 1418.

In the illustrated embodiment, front-end logic 1406 includes an instruction decoder or decoders 1408, register renaming logic 1410, and scheduling logic 1412. Decoder 1408 may decode instructions received. Register renaming logic 1410 may provide register renaming, for example to facilitate pipelining. Scheduling logic 1412 may schedule instruction execution, and may provide out-of-order (OOO) execution. Front-end logic 1406 may fetch incoming instructions, perform various processing (e.g., caching, decoding, branch predicting, etc.), and pass instructions to execution logic 1414.

Execution logic 1414 includes one or more execution units 1416-1-1416-N. Execution units 1416 may include hardware instructions and microcode to carry out the provided instructions.

Backend logic 1418 includes retirement logic 1420. Core 1402 may provide for speculative execution of instructions, branch prediction, and similar. Retirement logic 1420 may be configured to determine which predicted instructions were actually needed by the program flow.

Processor 1400 may also include a PtP controller 1432, which enables connection to an uncore, chipset, Northbridge, Southbridge, or bus, by way of example.

Figure 15:
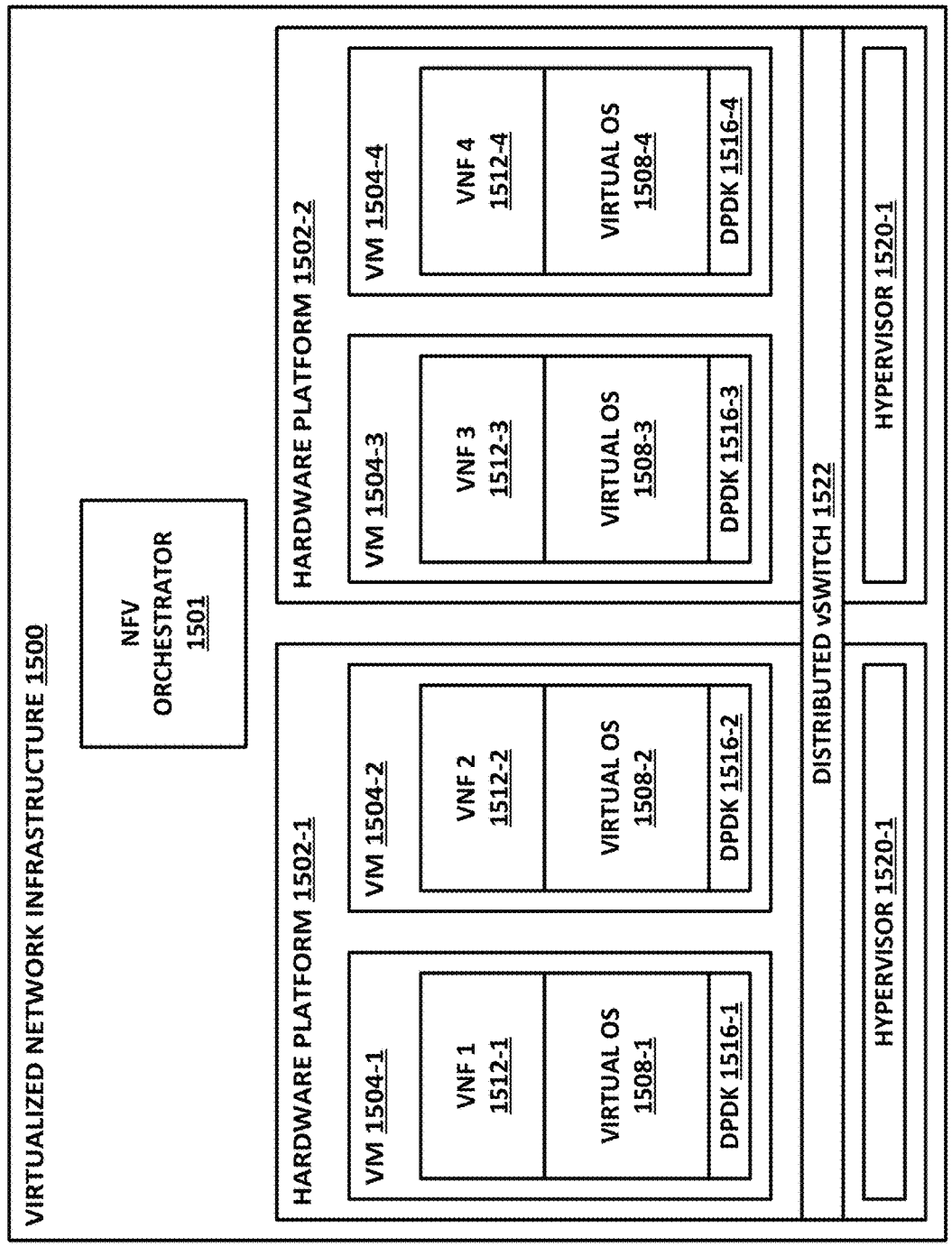
FIG. 15 is a block diagram of selected elements of a network function virtualization (NFV) infrastructure.

FIG. 15 is a block diagram of a network function virtualization (NFV) infrastructure 1500. In at least some embodiments, NFV may be used to provide crowdsourced reputations for wireless networks, according to the teachings of the present specification.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1500. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 15, an NFV orchestrator 1501 manages a number of the VNFs 1512 running on an NFVI 1500. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1501 a valuable system resource. Note that NFV orchestrator 1501 may provide a browser-based or graphical configuration interface, and in some embodiments may be integrated with SDN orchestration functions.

Note that NFV orchestrator 1501 itself may be virtualized (rather than a special-purpose hardware appliance). NFV orchestrator 1501 may be integrated within an existing SDN system, wherein an operations support system (OSS) manages the SDN. This may interact with cloud resource management systems (e.g., OpenStack) to provide NFV orchestration. An NFVI 1500 may include the hardware, software, and other infrastructure to enable VNFs to run. This may include a hardware platform 1502 on which one or more VMs 1504 may run. For example, hardware platform 1502-1 in this example runs VMs 1504-1 and 1504-2. Hardware platform 1502-2 runs VMs 1504-3 and 1504-4. Each hardware platform may include a hypervisor 1520, virtual machine manager (VMM), or similar function, which may include and run on a native (bare metal) operating system, which may be minimal so as to consume very few resources.

Hardware platforms 1502 may be or comprise a rack or several racks of blade or slot servers (including, e.g., processors, memory, and storage), one or more data centers, other hardware resources distributed across one or more geographic locations, hardware switches, or network interfaces. An NFVI 1500 may also include the software architecture that enables hypervisors to run and be managed by NFV orchestrator 1501.

Running on NFVI 1500 are a number of VMs 1504, each of which in this example is a VNF providing a virtual service appliance. Each VM 1504 in this example includes an instance of the Data Plane Development Kit (DPDK), a virtual operating system 1508, and an application providing the VNF 1512.

Virtualized network functions could include, as nonlimiting and illustrative examples, firewalls, intrusion detection systems, load balancers, routers, session border controllers, DPI services, network address translation (NAT) modules, or call security association.

The illustration of FIG. 15 shows that a number of VNFs 1504 have been provisioned and exist within NFVI 1500. This FIGURE does not necessarily illustrate any relationship between the VNFs and the larger network, or the packet flows that NFVI 1500 may employ.

The illustrated DPDK instances 1516 provide a set of highly-optimized libraries for communicating across a virtual switch (vSwitch) 1522. Like VMs 1504, vSwitch 1522 is provisioned and allocated by a hypervisor 1520. The hypervisor uses a network interface to connect the hardware platform to the data center fabric (e.g., an HFI). This HFI may be shared by all VMs 1504 running on a hardware platform 1502. Thus, a vSwitch may be allocated to switch traffic between VMs 1504. The vSwitch may be a pure software vSwitch (e.g., a shared memory vSwitch), which may be optimized so that data are not moved between memory locations, but rather, the data may stay in one place, and pointers may be passed between VMs 1504 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1522 is illustrated, wherein vSwitch 1522 is shared between two or more physical hardware platforms 1502.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer readable storage media having stored thereon executable instructions that, when executed, cause a hardware platform or other computing system, to carry out a method or procedure. For example, the instructions could be executable object code, including software instructions executable by a processor. The one or more tangible, non-transitory computer readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders.

In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

The following examples are provided by way of illustration.

Example 1 includes a mobile computing apparatus, comprising: a hardware platform comprising a processor and a memory; a user display; a global positioning system (GPS) driver; a network interface; and instructions encoded within the memory to instruct the processor to: receive a device location from the GPS driver; via the network interface, query a cloud-based wireless access point (WAP) reputation service for WAP reputation data of nearby WAPs; and drive to the user display an image of nearby WAPs having overlaid thereon WAP reputation data for the nearby WAPs.

Example 2 includes the mobile computing apparatus of example 1, further comprising a virtual reality interface to communicatively couple to a virtual reality headset, wherein the display includes an augmented reality display of the virtual reality headset.

Example 3 includes the mobile computing apparatus of example 1, further comprising a maps or navigation application, wherein the instructions are to overlay WAP reputation on points of interest on a display of the maps or navigation application.

Example 4 includes the mobile computing apparatus of example 1, wherein the reputation data comprise a security reputation.

Example 5 includes the mobile computing apparatus of example 4, wherein the reputation data further comprise a user rating.

Example 6 includes the mobile computing apparatus of example 4, wherein the reputation data further comprise cost data.

Example 7 includes the mobile computing apparatus of example 4, wherein the reputation data further comprise bandwidth, reliability, or availability data.

Example 8 includes the mobile computing apparatus of example 1, wherein the instructions are further to provide one-touch selection of a selected WAP, including automatically configuring a connection to the selected WAP.

Example 9 includes the mobile computing apparatus of example 8, wherein the instructions are further to provide a dedicated interface for accepting terms and conditions for the selected WAP.

Example 10 includes the mobile computing apparatus of example 8, wherein the instructions are further to receive from the WAP reputation service instructions to configure the selected WAP.

Example 11 includes the mobile computing apparatus of example 8, further comprising an application programming interface (API) into a payment application, wherein automatically configuring the connection further comprises negotiating payment via the payment application.

Example 12 includes the mobile computing apparatus of example 1, wherein the instructions are further to scan a QR code, and to automatically configure a selected WAP according to information from the scanned QR code.

Example 13 includes the mobile computing apparatus of example 1, wherein the instructions are further to determine that a selected WAP does not have a known reputation within the cloud-based WAP reputation service, make a provisional connection to the selected WAP, and make the connection non-provisional after determining that a connection condition has been satisfied.

Example 14 includes the mobile computing apparatus of example 13, wherein the connection condition comprises receiving user verification.

Example 15 includes the mobile computing apparatus of example 13, wherein the connection condition comprises scanning security settings of the selected WAP and determining that the selected WAP meets or exceeds minimum acceptable security criteria.

Example 16 includes the mobile computing apparatus of example 13, wherein making the provisional connection comprises sandboxing the connection, and wherein making the connection non-provisional comprises releasing the connection from the sandbox.

Example 17 includes the mobile computing apparatus of example 1, wherein the instructions are further to receive a selected WAP from the nearby WAPs with WAP reputation data, provisionally connect to the selected WAP, scan security settings of the selected WAP to verify the reputation data, and make the connection non-provisional.

Example 18 includes the mobile computing apparatus of example 17, wherein the instructions are further to upload updated reputation data for the selected WAP to the cloud-based WAP reputation service.

Example 19 includes the mobile computing apparatus of example 17, wherein the instructions are to verify the reputation data only if instructed to by the cloud-based WAP reputation service.

Example 20 includes one or more tangible, non-transitory computer readable storage media having stored thereon executable instructions to instruct a processor to: receive a geolocation; query a cloud service for known wireless access points (WAPs) near the geolocation; receive from the cloud service a plurality of known WAPs, including reputation data for the known WAPs; associate the known WAPs with points of interest near the geolocation; and display to a user a composite image comprising the points of interest, the plurality of known WAPs, and the reputation data.

Example 21 includes the one or more tangible, non-transitory computer readable storage media of example 20, further comprising instructions for a virtual reality interface to communicatively couple to a virtual reality headset, including a display comprising an augmented reality display of the virtual reality headset.

Example 22 includes the one or more tangible, non-transitory computer readable storage media of example 20, further comprising instructions to provide a maps or navigation application, wherein the instructions are to overlay the reputation data for the known WAPs on the points of interest on the composite image.

Example 23 includes the one or more tangible, non-transitory computer readable storage media of example 20, wherein the reputation data comprise a security reputation.

Example 24 includes the one or more tangible, non-transitory computer readable storage media of example 23, wherein the reputation data further comprise a user rating.

Example 25 includes the one or more tangible, non-transitory computer readable storage media of example 23, wherein the reputation data further comprise cost data.

Example 26 includes the one or more tangible, non-transitory computer readable storage media of example 23, wherein the reputation data further comprise bandwidth, reliability, or availability data.

Example 27 includes the one or more tangible, non-transitory computer readable storage media of example 20, wherein the instructions are further to provide one-touch selection of a selected WAP, including automatically configuring a connection to the selected WAP.

Example 28 includes the one or more tangible, non-transitory computer readable storage media of example 27, wherein the instructions are further to provide a dedicated interface for accepting terms and conditions for the selected WAP.

Example 29 includes the one or more tangible, non-transitory computer readable storage media of example 27, wherein the instructions are further to receive from the cloud service instructions to configure the selected WAP.

Example 30 includes the one or more tangible, non-transitory computer readable storage media of example 27, wherein the instructions are further to provide an application programming interface (API) into a payment application, and wherein automatically configuring the connection further comprises negotiating payment via the payment application.

Example 31 includes the one or more tangible, non-transitory computer readable storage media of example 20, wherein the instructions are further to scan a QR code, and to automatically configure a selected WAP according to information from the scanned QR code.

Example 32 includes the one or more tangible, non-transitory computer readable storage media of example 20, wherein the instructions are further to determine that a selected WAP does not have a known reputation within the cloud service, make a provisional connection to the selected WAP, and make the connection non-provisional after determining that a connection condition has been satisfied.

Example 33 includes the one or more tangible, non-transitory computer readable storage media of example 32, wherein the connection condition comprises receiving user verification.

Example 34 includes the one or more tangible, non-transitory computer readable storage media of example 32, wherein the connection condition comprises scanning security settings of the selected WAP and determining that the selected WAP meets or exceeds minimum acceptable security criteria.

Example 35 includes the one or more tangible, non-transitory computer readable storage media of example 32, wherein making the provisional connection comprises sandboxing the connection, and wherein making the connection non-provisional comprises releasing the connection from the sandbox.

Example 36 includes the one or more tangible, non-transitory computer readable storage media of example 20, wherein the instructions are further to receive a selected WAP from the plurality of known WAPs including reputation data, provisionally connect to the selected WAP, scan security settings of the selected WAP to verify the reputation data, and make the connection non-provisional.

Example 37 includes the one or more tangible, non-transitory computer readable storage media of example 36, wherein the instructions are further to upload updated reputation data for the selected WAP to the cloud service.

Example 38 includes the one or more tangible, non-transitory computer readable storage media of example 36, wherein the instructions are to verify the reputation data only if instructed to by the cloud service.

Example 39 includes a computer-implemented method of providing wireless access point (WAP) reputations, comprising: sending a geolocation to a cloud server; receiving from the cloud server a set of locations of nearby WAPs and reputation data for the nearby WAPs; receiving an image representative of the geolocation; and overlaying on the image the locations of the nearby WAPs and the reputation data.

Example 40 includes the method of example 39, further comprising communicatively coupling a virtual reality interface to a virtual reality headset, including a display comprising an augmented reality display of the virtual reality headset.

Example 41 includes the method of example 39, further comprising providing a maps or navigation application, and driving the overlaid image to a display of the maps or navigation application.

Example 42 includes the method of example 39, wherein the reputation data comprise a security reputation.

Example 43 includes the method of example 42, wherein the reputation data further comprise a user rating.

Example 44 includes the method of example 42, wherein the reputation data further comprise cost data.

Example 45 includes the method of example 42, wherein the reputation data further comprise bandwidth, reliability, or availability data.

Example 46 includes the method of example 39, further comprising providing one-touch selection of a selected WAP, including automatically configuring a connection to the selected WAP.

Example 47 includes the method of example 46, further comprising providing a dedicated interface for accepting terms and conditions for the selected WAP.

Example 48 includes the method of example 46, further comprising receiving from the cloud server instructions to configure the selected WAP.

Example 49 includes the method of example 46, further comprising providing an application programming interface (API) into a payment application, wherein automatically configuring the connection further comprises negotiating payment via the payment application.

Example 50 includes the method of example 39, further comprising scanning a QR code, and automatically configuring a selected WAP according to information from the scanned QR code.

Example 51 includes the method of example 39, further comprising determining that a selected WAP does not have a known reputation within the cloud server, making a provisional connection to the selected WAP, and making the connection non-provisional after determining that a connection condition has been satisfied.

Example 52 includes the method of example 51, wherein the connection condition comprises receiving user verification.

Example 53 includes the method of example 51, wherein the connection condition comprises scanning security settings of the selected WAP and determining that the selected WAP meets or exceeds minimum acceptable security criteria.

Example 54 includes the method of example 51, wherein making the provisional connection comprises sandboxing the connection, and wherein making the connection non-provisional comprises releasing the connection from the sandbox.

Example 55 includes the method of example 39, further comprising receiving a selected WAP from the nearby WAPs with WAP reputation data, provisionally connecting to the selected WAP, scanning security settings of the selected WAP to verify the reputation data, and making the connection non-provisional.

Example 56 includes the method of example 55, further comprising uploading updated reputation data for the selected WAP to the cloud server.

Example 57 includes the method of example 55, further comprising verifying the reputation data only if instructed to by the cloud server.

Example 58 includes an apparatus comprising means for performing the method of any of examples 39-57.

Example 59 includes the apparatus of example 58, wherein the means for performing the method comprise a processor and a memory.

Example 60 includes the apparatus of example 59, wherein the memory comprises machine-readable instructions that, when executed, cause the apparatus to perform the method of any of examples 39-57.

Example 61 includes the apparatus of any of examples 58-60, wherein the apparatus is a computing system.

Example 62 includes at least one computer readable medium comprising instructions that, when executed, implement a method or realize an apparatus as illustrated in any of examples 39-61.

Example 63 includes a reputation server, comprising: a hardware platform comprising a processor and a memory; a telemetry collector to receive telemetry from a reporting endpoint, the telemetry comprising a location of a scanned wireless access point (WAP), and security metadata for the scanned WAP; a reputation builder to compute a reputation for the scanned WAP and cache the reputation in a reputation store; and a query responder to receive from a requesting endpoint a reputation query for a geolocation, and return from the reputation store a set of known WAPs near the geolocation, and associated reputation data for the known WAPs.

Example 64 includes the reputation server of example 63, wherein the query responder is further to receive a query comprising identifying information for a single WAP, query the reputation store for metadata about the single WAP, and return the metadata.

Example 65 includes the reputation server of example 63, wherein the hardware platform is a disaggregated hardware platform.

Example 66 includes the reputation server of example 63, further comprising a virtualization or containerization layer.

Example 67 includes the reputation server of example 63, wherein the telemetry further comprises a locally computed reputation from the reporting endpoint.

Example 68 includes the reputation server of example 63, wherein the reputation builder is to build a composite reputation for a WAP from telemetry reported by a plurality of endpoints.

Example 69 includes the reputation server of example 63, further comprising a machine classifier to classify WAPs according to reported telemetry.

Example 70 includes the reputation server of example 69, wherein the machine classifier comprises a machine learning model or neural network.

Example 71 includes the reputation server of example 63, further comprising a certification server to receive from an operator of a WAP a request for certification, query the reputation store for a reputation for the WAP, and return to the operator the reputation via a secured channel.

What is claimed is:

1. A mobile computing apparatus, comprising:
    a hardware platform comprising a processor and a memory;
    a user display;
    a global positioning system (GPS) driver;
    a camera;
    a network interface; and
    instructions encoded within the memory to instruct the processor to:
        receive a device location from the GPS driver;
        via the network interface, query a cloud-based wireless access point (WAP) reputation service for WAP reputation data of nearby WAPs, wherein the WAP reputation data comprise crowd-sourced data from users who have previously connected to the WAPs; and
        drive to the user display an image of nearby WAPs wherein the user display has overlaid thereon WAP reputation data for the nearby WAPs.

2. The mobile computing apparatus of claim 1, further comprising a virtual reality interface to communicatively couple to a virtual reality headset, wherein the user display includes an augmented reality display of the virtual reality headset.

3. The mobile computing apparatus of claim 1, further comprising a maps or navigation application, wherein the instructions are to overlay WAP reputation on points of interest on a display of the maps or navigation application.

4. The mobile computing apparatus of claim 1, wherein the WAP reputation data comprise a security reputation.

5. The mobile computing apparatus of claim 4, wherein the WAP reputation data further comprise a user rating.

6. The mobile computing apparatus of claim 4, wherein the WAP reputation data further comprise cost data.

7. The mobile computing apparatus of claim 4, wherein the WAP reputation data further comprise bandwidth, reliability, or availability data.

8. The mobile computing apparatus of claim 1, wherein the instructions are further to provide one-touch selection of a selected WAP, including automatically configuring a connection to the selected WAP.

9. The mobile computing apparatus of claim 1, wherein the instructions are further to determine that a selected WAP does not have a known reputation within the cloud-based WAP reputation service, make a provisional connection to the selected WAP, and make the connection non-provisional after determining that a connection condition has been satisfied.

10. The mobile computing apparatus of claim 1, wherein the instructions are further to receive a selected WAP from the nearby WAPs with WAP reputation data, provisionally connect to the selected WAP, scan security settings of the selected WAP to verify the WAP reputation data, and make the connection non-provisional.

11. The mobile computing apparatus of claim 10, wherein the instructions are further to upload updated reputation data for the selected WAP to the cloud-based WAP reputation service.

12. One or more tangible, non-transitory computer readable storage media having stored thereon executable instructions to instruct a processor to:
    receive a geolocation;
    query a cloud service for known wireless access points (WAPs) near the geolocation;
    receive from the cloud service a plurality of known WAPs, including reputation data for the known WAPs, wherein the reputation data comprise crowd-sourced data from users who have previously connected to the plurality of known WAPs;
    associate the known WAPs with points of interest in a local environment; and
    display to a user a composite image comprising the points of interest, the plurality of known WAPs, and the reputation data.

13. The one or more tangible, non-transitory computer readable storage media of claim 12, further comprising instructions for a virtual reality interface to communicatively couple to a virtual reality headset, including a display comprising an augmented reality display of the virtual reality headset.

14. The one or more tangible, non-transitory computer readable storage media of claim 12, further comprising instructions to provide a maps or navigation application, wherein the instructions are to overlay the reputation data for the known WAPs on the points of interest on the composite image.

15. The one or more tangible, non-transitory computer readable storage media of claim 12, wherein the executable instructions are further to provide one-touch selection of a selected WAP, including automatically configuring a connection to the selected WAP.

16. The one or more tangible, non-transitory computer readable storage media of claim 15, wherein the executable instructions are further to provide a dedicated interface for accepting terms and conditions for the selected WAP.

17. The one or more tangible, non-transitory computer readable storage media of claim 15, wherein the executable instructions are further to receive, from the cloud service, instructions to configure the selected WAP.

18. A computer-implemented method of providing wireless access point (WAP) reputations, comprising:
sending a geolocation to a cloud server;
receiving from the cloud server a set of locations of nearby WAPs and reputation data for the nearby WAPs, wherein the reputation data comprise crowd-sourced data from users who have previously connected to the WAPs;
receiving a real-time camera view of the geolocation; and
overlaying, on the real-time camera view, the set of locations of the nearby WAPs and the reputation data.

19. The method of claim 18, further comprising communicatively coupling a virtual reality interface to a virtual reality headset, including a display comprising an augmented reality display of the virtual reality headset.

20. The method of claim 18, further comprising providing an augmented reality view including the locations of the nearby WAPs.

* * * * *

UNITED STATES PATENT AND TRADEMARK OFFICE
CERTIFICATE OF CORRECTION

| | |
|---|---|
| PATENT NO. | : 12,025,711 B2 |
| APPLICATION NO. | : 16/831477 |
| DATED | : July 2, 2024 |
| INVENTOR(S) | : Rodney Derrick Cambridge, Jonathan David Dyton and Andrea Vito Colucci |

It is certified that error appears in the above-identified patent and that said Letters Patent is hereby corrected as shown below:

In the Drawings

Sheet 13 of 15, in "Fig. 13", delete "CORE0" and insert -- CORE 0 --, therefor.

Signed and Sealed this
Thirteenth Day of August, 2024

Katherine Kelly Vidal
*Director of the United States Patent and Trademark Office*